United States Patent [19]

Jahnke et al.

[11] Patent Number: 5,637,557
[45] Date of Patent: Jun. 10, 1997

[54] COMPOSITIONS CONTAINING DERIVATIVES OF SUCCINIC ACYLATING AGENT OR HYDROXYAROMATIC COMPOUNDS AND METHODS OF USING THE SAME

[75] Inventors: Richard W. Jahnke; John W. Forsberg, both of Mentor, Ohio

[73] Assignee: The Lubrizol Corporation, Wickliffe, Ohio

[21] Appl. No.: 241,830

[22] Filed: May 12, 1994

Related U.S. Application Data

[63] Continuation-in-part of Ser. No. 908,702, Jul. 2, 1992, abandoned, which is a continuation-in-part of Ser. No. 852,585, Mar. 17, 1992, abandoned.

[51] Int. Cl.$^6$ ................................................. C09K 7/00
[52] U.S. Cl. .......................... 507/246; 507/224; 507/225; 507/239; 507/260
[58] Field of Search ............................ 507/246, 224, 507/225, 239, 260

[56] References Cited

U.S. PATENT DOCUMENTS

| | | | |
|---|---|---|---|
| 2,938,016 | 5/1960 | Johnson | 260/78.5 |
| 2,977,334 | 3/1961 | Zopf et al. | 260/27 |
| 2,980,653 | 4/1961 | Johnson | 260/78.5 |
| 3,085,994 | 4/1963 | Muskat | 260/78.5 |
| 3,215,707 | 11/1965 | Rense | 260/326.3 |
| 3,219,666 | 11/1965 | Norman et al. | 260/268 |
| 3,231,587 | 1/1966 | Rense | 260/346.8 |
| 3,342,787 | 9/1967 | Muskat | 260/78.5 |
| 3,381,022 | 4/1968 | LeSuer | 260/404.8 |
| 3,418,292 | 12/1968 | Muskat | 260/78.5 |
| 3,451,979 | 6/1969 | Muskat | 260/78.5 |
| 3,522,179 | 7/1970 | LeSuer | 252/51.5 |
| 3,536,461 | 10/1970 | Mueller | 44/62 |
| 3,558,570 | 1/1971 | Rinno et al. | 260/78.5 |
| 3,702,300 | 11/1972 | Coleman | 252/51.5 A |
| 3,709,819 | 1/1973 | Browning et al. | 252/8.5 P |
| 3,723,375 | 3/1973 | Field et al. | 260/29.6 |
| 3,738,934 | 6/1973 | Browning et al. | 252/8.5 P |
| 3,912,764 | 10/1975 | Palmer, Jr. | 260/346.8 |
| 3,980,569 | 9/1976 | Pindar et al. | 252/51.5 R |
| 4,110,349 | 8/1978 | Cohen | 260/346.74 |
| 4,120,800 | 10/1978 | Valcho et al. | 252/8.554 |
| 4,122,020 | 10/1978 | Valcho et al. | 252/8.554 |
| 4,140,640 | 2/1979 | Scherubel | 252/8.55 |
| 4,234,435 | 11/1980 | Meinhardt | 252/51.5 A |
| 4,256,605 | 3/1981 | Baker | 252/312 |
| 4,306,980 | 12/1981 | Brandt et al. | 252/8.5 P |
| 4,329,249 | 5/1982 | Forsberg | 252/34.7 |
| 4,368,133 | 1/1983 | Forsberg | 252/75 |
| 4,435,297 | 3/1984 | Forsberg | 252/34.7 |
| 4,436,636 | 3/1984 | Carnicon | 252/8.5 P |
| 4,442,241 | 4/1984 | Drake et al. | 523/130 |
| 4,447,348 | 5/1984 | Forsberg | 252/75 |
| 4,448,703 | 5/1984 | Forsberg | 252/75 |
| 4,454,059 | 6/1984 | Pindar et al. | 252/51.5 |
| 4,503,170 | 3/1985 | Drake et al. | 523/130 |
| 4,526,950 | 7/1985 | Grava | 526/272 |
| 4,566,978 | 1/1986 | Stong et al. | 252/8.5 |
| 4,616,074 | 10/1986 | Ruffner | 526/318 |
| 4,618,655 | 10/1986 | Dehm et al. | 525/344 |
| 4,644,035 | 2/1987 | Dehm et al. | 525/344 |
| 4,695,401 | 9/1987 | Sweeney | 252/312 |
| 4,708,753 | 11/1987 | Forsberg | 149/2 |
| 4,770,803 | 9/1988 | Forsberg | 252/75 |
| 4,776,966 | 10/1988 | Baker | 252/8.515 |
| 4,816,551 | 3/1989 | Oshler | 528/295.3 |
| 4,828,633 | 5/1989 | Forsberg | 149/2 |
| 4,844,756 | 7/1989 | Forsberg | 149/2 |
| 4,849,131 | 7/1989 | Sweeney | 252/312 |

FOREIGN PATENT DOCUMENTS

| | | | |
|---|---|---|---|
| 144219 | 6/1920 | Germany. | |
| 2024855 | 1/1980 | United Kingdom | 3/30 |

OTHER PUBLICATIONS

OTC 5904 Optimising Oil Muds for Offshore Drilling and Lower Environment Impact, 1989, Offshore Technology, pp. 203–212.

*Primary Examiner*—Sharon Gibson
*Assistant Examiner*—Valerie Fee
*Attorney, Agent, or Firm*—John H. Englemann; David M. Shold; Frederick D. Hunter

[57] ABSTRACT

This invention relates to a composition comprising: a mixture of a brine and a liquid oil, and (A) an emulsifying amount of (i) at least one reaction product of a hydrocarbyl-substituted succinic acylating agent, and at least one of (a) ammonia, (b) an alcohol, (c) an amine, (d) or mixtures thereof, or at least one salt of the reaction product; or (ii) at least one reaction product of a hydroxyaromatic compound, an aldehyde, and an amine. The compositions of the present invention have beneficial emulsification properties. These compositions are useful in drilling, working over and completing well-bore holes. The well-drilling compositions of the present invention have beneficial viscosity, pumping and suspension properties.

15 Claims, No Drawings

COMPOSITIONS CONTAINING DERIVATIVES OF SUCCINIC ACYLATING AGENT OR HYDROXYAROMATIC COMPOUNDS AND METHODS OF USING THE SAME

This is a continuation-in-part of applications Ser. No. 07/908,702 filed on Jul. 2, 1992, now abandoned which is a continuation-in-part of Ser. No. 07/852,585 filed Mar. 17, 1992 now abandoned.

TECHNICAL FIELD

This invention relates to compositions containing an emulsifying amount of reaction products of hydrocarbyl-substituted succinic acylating agents or hydroxyaromatic compounds.

BACKGROUND OF THE INVENTION

The primary functions of a drilling fluid or mud are: to carry chips and cuttings produced by drilling to the surface; to lubricate and cool the drill bit and drill string; to form a filter cake which obstructs filtrate invasion in the formation; to maintain the walls of the borehole; to control formation pressures and prevent lost returns; to suspend cuttings during rig shutdowns; and to protect the formation for later successful completion and production.

Useful drilling fluids or muds must maintain rheological and viscosity properties under normal operation conditions. Also, the drilling fluids or muds must be able to suspend cuttings and weighting materials upon stopping of circulation of the drilling fluid. It is desirable to have drilling fluids or muds which maintain thixotropy and rheology even with increased solids.

U.S. Pat. Nos. 2,938,016; 2,980,653; 3,085,994; 3,342,787; 3,418,292; 3,451,979; 3,536,461; 3,558,570; 3,702,300; and 3,723,375 relate to carboxy-containing interpolymers, methods of making the carboxy-containing interpolymers, and esters and nitrogen-containing esters derived therefrom.

U.S. Pat. No. 2,977,334 relates to derivatives of ethylene-maleic anhydride copolymers. These polymers are useful as coating resins, synthetic varnish for drying oils, additive for mineral or synthetic oils, paper and textile sizing agents, laminating, casting and potting resins, adhesive agents, waterproofing agents, film-forming polymers and plasticizers.

U.S. Pat. Nos. 3,215,707; 3,219,666; 3,231,587; 3,381,022; 3,522,179; 3,912,764; 4,110,349; 4,234,435 and UK 1,440,219 relate to succinic acylating agents and reaction products of succinic acylating agents and alcohols, amines, or ammonia, and methods of making the same.

U.S. Pat. No. 3,738,934 issued to Broning et al. relates to oil-base drilling fluid compositions, additives and filter cakes which are effective under high temperatures and pressures. The fluid is formed by dispersing particles of an oil and water insoluble vinyl toluene-acrylate copolymer resin in a water-in-oil emulsion drilling fluid.

U.S. Pat. Nos. 3,980,569 and 4,454,059 relate to reaction products of hydroxyaromatic compounds, aldehydes and amines.

U.S. Pat. No. 4,140,640 relates to a self-breaking retarded acid emulsion. The emulsion comprises an aqueous acidizing solution, an oil, an effective amount of an alkyl $C_8$–$C_{18}$ primary fatty amine and at least one diethanolamide of at least one $C_8$–$C_{18}$ fatty acid.

U.S. Pat. No. 4,306,980 relates to invert emulsion well servicing fluids. The fluids can be formed by combining a certain oleophilic anhydrides and lime in a water-in-oil emulsion comprising a liquid oleaginous phase and an aqueous phase. The oleophilic anhydrides include alkenyl succinic anhydrides and polymers of alkenyl succinic anhydride, such as alpha-olefin copolymers.

U.S. Pat. Nos. 4,329,249; 4,368,133; 4,435,297; 4,447,348; and 4,448,703 relate to reaction products of a carboxylic acylating agent and a hydroxyamine.

U.S. Pat. No. 4,436,636 relates to invert emulsion well servicing fluids. The fluid comprises a liquid oleaginous phase, an aqueous phase, an emulsifying agent and a solid particulate polyolefin. The emulsifying agent may be a polyamide type formed by the reaction of a polyamine with fatty acids and a dibasic acid.

U.S. Pat. No. 4,526,950 relates to polymers of alpha-olefins and alpha, beta-unsaturated carboxylic acids or derivatives and methods of making these polymers.

U.S. Pat. No. 4,566,978 relates to high temperature drilling fluids. The drilling fluid comprises a water-base, clay suspended in the base and a hydrolyzed terpolymer of maleic anhydride, styrene and a third monomer selected from a acrylamide, methacrylamide, acrylic acid or methacrylic acid.

U.S. Pat. No. 4,708,753 relates to water-in-oil emulsions. The emulsion comprises a continuous oil phase, a discontinuous aqueous phase, at least one salt derived from a hydrocarbyl-substituted carboxylic acid or anhydride, or ester or a derivative of said acid or ester and an amine, and a water-soluble, oil-insoluble functional additive dissolved in the aqueous phase, with a proviso that when ammonium nitrate is the functional additive, then the salt is other than an ester/salt formed from the reaction of a polyisobutenyl ($\overline{M}$=950) succinic anhydride with diethylethanolamine in a ratio of one equivalent of anhydride to one equivalent of amine.

U.S. Pat. No. 4,776,966 relates to water in oil emulsion drilling fluid compositions in which a block or graft copolymer, of the general formula $(A\text{---}COO)_mB$, where A and B represent polymeric components derived from a specific type of oil-soluble complex monocarboxylic acid and from a water-soluble polyalkylene glycol or polyether polyol, respectively, and m is an integer at least 2, serves as the emulsifier. A surfactant containing a $C_{30-500}$ hydrocarbon chain as a hydrophobic component, and a polar component adsorbable on to the particulate solid surface serves as a agent for dispersing solid particulate matter in the oil phase. A particularly useful example of the emulsifier is a copolymer in which each A component is the residue of poly(12-hydroxystearic acid) chain terminated with stearic acid of molecular weight approximately 1750, and in which each B component is derived from polyethylene glycol of molecular weight 1500. This copolymer may be prepared by self condensation of commercial 12-hydroxystearic acid (which already contain a proportion of stearic acid which can function as a chain terminator), followed by reaction of the product with polyethylene glycol in the presence of an esterification catalyst. An example of a preferred dispersant is poly(isobutenyl)succinic anhydride having a molecular weight in the range of 400 to 5000. Optionally the succinic anhydride may be reacted with molecules containing a hydroxyl or an amino group.

SUMMARY OF THE INVENTION

This invention relates to a composition comprising: a mixture of a brine and a liquid oil, and (A) an emulsifying amount of (i) at least one reaction product of a hydrocarbyl-substituted succinic acylating agent, and at least one of (a) ammonia, (b) an alcohol, or (c) an amine, or at least one salt of the reaction product; or (ii) at least one reaction product of a hydroxyaromatic compound, an aldehyde, and an amine. The compositions of the present invention have beneficial emulsification properties. These compositions are useful in drilling, working and completing well bore holes. The compositions of the present invention have beneficial viscosity, pumping and suspension properties.

DESCRIPTION OF THE PREFERRED EMBODIMENTS

The term "emulsion" as used in the specification and the claims is intended to cover water-in-oil emulsion. The term is also intended to cover compositions derived from or formulated as water-in-oil emulsions which are gelatinous or semi-gelatinous compositions.

The term "hydrocarbyl" includes hydrocarbon, as well as substantially hydrocarbon, groups. Substantially hydrocarbon describes groups which contain non-hydrocarbon substituents which do not alter the predominantly hydrocarbon nature of the group.

Examples of hydrocarbyl groups include the following:

(1) hydrocarbon substituents, that is, aliphatic (e.g., alkyl or alkenyl), alicyclic (e.g., cycloalkyl, cycloalkenyl) substituents, aromatic-substituted aliphatic substituents or aromatic-substituted alicyclic substituents, or aliphatic- and alicyclic-substituted aromatic substituents and the like as well as cyclic substituents wherein the ring is completed through another portion of the molecule (that is, for example, any two indicated substituents may together form an alicyclic radical);

(2) substituted hydrocarbon substituents, that is, those substituents containing non-hydrocarbon groups which, in the context of this invention, do not alter the predominantly hydrocarbon nature of the substituent; those skilled in the art will be aware of such groups (e.g., halo (especially chloro and fluoro), hydroxy, alkoxy, mercapto, alkylthio, nitro, nitroso, sulfoxy, etc.);

(3) hetero substituents, that is, substituents which will, while having a predominantly hydrocarbon character within the context of this invention, contain an atom other than carbon present in a ring or chain otherwise composed of carbon atoms. Suitable heteroatoms will be apparent to those of ordinary skill in the art and include, for example, sulfur, oxygen, nitrogen and such substituents as, e.g., pyridyl, furyl, thienyl, imidazolyl, etc. In general, no more than about 2, preferably no more than one, non-hydrocarbon substituent will be present for every ten carbon atoms in the hydrocarbyl group. Typically, there will be no such non-hydrocarbon substituents in the hydrocarbyl group. In one embodiment, the hydrocarbyl group is purely hydrocarbon.

As described above, the present invention relates to a composition containing (A) an emulsifying amount of (i) at least one reaction product of a hydrocarbyl-substituted succinic acylating agent, and (a) ammonia, (b) an alcohol, or (c) an amine, or at least one salt of the reaction product; or (ii) at least one reaction product of a hydroxyaromatic compound, an aldehyde, and an amine. The compositions of the present invention do not include the block or graft copolymer emulsifiers, of the general formula (A—COO)$_m$B, described above, and disclosed in U.S. Pat. No. 4,776,966. In the present invention, the derivative of the hydrocarbyl-substituted succinic acylating agent or the reaction product of a hydroxyaromatic compound, an aldehyde, and an amine serve as the emulsifier in the composition.

A-(i) Reaction Products of Succinic Acylating Agents

The hydrocarbyl-substituted succinic acylating agents include succinic acids, halides, esters, and anhydrides, preferably, acids, esters or anhydrides, more preferably anhydrides. The hydrocarbyl group generally contains an average of at least about 8, or about 30, or about 35 up to about 350, or to about 200, or to about 100 carbon atoms. In one embodiment, the hydrocarbyl group is derived from a polyalkene.

The polyalkene is characterized by an $\overline{M}n$ (number average molecular weight) of at least about 500. Generally, the polyalkene is characterized by an $\overline{M}n$ of about 500, or about 700, or about 800, or even about 900 up to about 5000, or to about 2500, or to about 2000, or even to about 1500. In another embodiment $\overline{M}n$ varies between about 500, or about 700, or about 800 up to about 1200 or to about 1300.

The polyalkenes include homopolymers and interpolymers of polymerizable olefin monomers of 2 to about 16 or to about 6, or to about 4 carbon atoms. The olefins may be monoolefins such as ethylene, propylene, 1-butene, isobutene, and 1-octene; or a polyolefinic monomer, such as diolefinic monomer, such 1,3-butadiene and isoprene. In one embodiment, the interpolymer is a homopolymer. An example of a homopolymer is a polybutene. In one instance about 50% of the polybutene is derived from isobutylene. The polyalkenes are prepared by conventional procedures.

In one embodiment, the hydrocarbyl groups are derived from polyalkenes having an $\overline{M}n$ of at least about 1300, or about 1500 up to about 5000, or to about 3000, or to about 2500, or to about 2000, and the $\overline{Mw}/\overline{Mn}$ is from about 1.5 or about 1.8, or about 2, or to about 2.5 to about 3.6, or to about 3.2. The preparation and use of substituted succinic acylating agents wherein the substituent is derived from such polyalkenes are described in U.S. Pat. No. 4,234,435, the disclosure of which is hereby incorporated by reference.

In another embodiment, the succinic acylating agents are prepared by reacting the above described polyalkene with an excess of maleic anhydride to provide substituted succinic acylating agents wherein the number of succinic groups for each equivalent weight of substituent group is at least 1.3, or to about 1.5, or to about 1.7, or to about 1.8. The maximum number generally will not exceed 4.5, or to about 2.5, or to about 2.1, or to about 2.0.

The polyalklene may be any of those described above. In one embodiment, the polyalkene has an $\overline{M}n$ from about 1300, or about 1500, or to about 1600 to about 5000, or to about 2800, or to about 2400, or to about 2000 and a Mw/Mn of at least 1.5, as described above. The preparation and use of substituted succinic acylating agents wherein the substituent is derived from such polyolefins are described in U.S. Pat. No. 4,234,435, the disclosure of which is hereby incorporated by reference.

In another embodiment, the hydrocarbyl group contains an average from about 8, or about 10, or about 12 up to about 40, or to about 30, or to about 24, or to about 20 carbon atoms. In one embodiment, the hydrocarbyl group contains an average from about 16 to about 18 carbon atoms. In another embodiment, the hydrocarbyl group is tetrapropenyl group. In one embodiment, the hydrocarbyl group is an alkenyl group.

The hydrocarbyl group may be derived from one or more olefins having from about 2 to about 40 carbon atoms or oligomers thereof. These olefins are preferably alpha-olefins (sometimes referred to as mono-1-olefins) or isomerized alpha-olefins. Examples of the alpha-olefins include ethylene, propylene, butylene, 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-henicosene, 1-docosene, 1-tetracosene, etc. Commercially available alpha-olefin fractions that may be used include the $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{16-20}$ alpha-olefins, $C_{22-28}$ alpha-olefins, etc. In one embodiment, the olefins are $C_{16}$ and $C_{16-18}$ alpha-olefins. Additionally, $C_{30}+$ alpha-olefin fractions such as those available from Gulf Oil Company under the name Gulftene can be used. In one embodiment, the olefin monomers include ethylene, propylene and 1-butene.

Isomerized alpha-olefins are alpha-olefins that have been converted to internal olefins. The isomerized alpha-olefins suitable for use herein are usually in the form of mixtures of internal olefins with some alpha-olefins present. The procedures for isomerizing alpha-olefins are well known to those in the art. Briefly these procedures involve contacting alpha-olefin with a cation exchange resin at a temperature in a range of about 80° to about 130° C. until the desired degree of isomerization is achieved. These procedures are described for example in U.S. Pat. No. 4,108,889 which is incorporated herein by reference.

The mono-olefins may be derived from the cracking of paraffin wax. The wax cracking process yields both even and odd number $C_{6-20}$ liquid olefins of which 85% to 90% are straight chain 1-olefins. The balance of the cracked wax olefins is made up of internal olefins, branched olefins, diolefins, aromatics and impurities. Distillation of the $C_{6-20}$ liquid olefins, obtained from the wax cracking process, yields fractions (e.g., $C_{15-18}$ alpha-olefins) which are useful in preparing the succinic acylating agents.

Other mono-olefins can be derived from the ethylene chain growth process. This process yields even numbered straight-chain 1-olefins from a controlled Ziegler polymerization. Other methods for preparing the mono-olefins include chlorination-dehydrochlorination of paraffin and catalytic dehydrogenation of paraffins.

The above procedures for the preparation of mono-olefins are well known to those of ordinary skill in the art and are described in detail under the heading "Olefins" in the *Encyclopedia of Chemical Technology*, Second Edition, Kirk and Othmer, Supplement, Pages 632,657, Interscience Publishers, Div. of John Wiley and Son, 1971, which is hereby incorporated by reference for its relevant disclosures pertaining to methods for preparing mono-olefins.

The succinic acylating agents are prepared by reacting the above-described olefins, isomerized olefins or oligomers thereof with unsaturated carboxylic acylating agents, such as itaconic, citraconic, or maleic acylating agents at a temperature of about 160°, or about 185° C. up to about 240° C., or to about 210° C. Maleic acylating agents are the preferred unsaturated acylating agent. The procedures for preparing the acylating agents are well known to those skilled in the art and have been described for example in U.S. Pat. No. 3,412,111; and Ben et al, "The Ene Reaction of Maleic Anhydride With Alkenes", J. C. S. Perkin II (1977), pages 535–537. These references are incorporated by reference for their disclosure of procedures for making the above acylating agents. In one embodiment, the alkenyl group is derived from oligomers of lower olefins, i.e., olefins containing from 2 to about 6, or about 4 carbon atoms. Examples of these olefins include ethylene, propylene and butylene.

The olefin, olefin oligomer, or polyalkene may be reacted with the carboxylic reagent such that there is at least one mole of carboxylic reagent for each mole of olefin, olefin oligomer, or polyalkene that reacts. Preferably, an excess of carboxylic reagent is used. In one embodiment, this excess is between about 5% to about 25%. In another embodiment, the excess is greater than 40%, or greater than 50%, and even greater than 70%.

The conditions, i.e., temperature, agitation, solvents, and the like, for forming the hydrocarbyl-substituted succinic acylating agent, are known to those in the art. Examples of patents describing various procedures for preparing useful acylating agents include U.S. Pat. No. 3,215,707 (Rense); U.S. Pat. No. 3,219,666 (Norman et al); U.S. Pat. No. 3,231,587 (Rense); U.S. Pat. No. 3,912,764 (Palmer); U.S. Pat. No. 4,110,349 (Cohen); and U.S. Pat. No. 4,234,435 (Meinhardt et al); and U.K. 1,440,219. The disclosures of these patents are hereby incorporated by reference.

The above described hydrocarbyl-substituted succinic acylating agents are reacted with (a) ammonia, (b) an alcohol, or (c) an amine to form reaction product A-(i).

(b) Alcohols

The alcohols include compounds of general formula $R''(OH)_m$ wherein $R''$ is a monovalent or polyvalent organic group joined to the —OH groups through a carbon bond, and m is an integer of from 1 (in one embodiment two) to about 10, or to about 6 wherein the organic group is a hydrocarbyl group. In one embodiment, $R''$ contains 2, or about 3, or about 4 up to about 40, or to about 30, or to about 24 carbon atoms. The alcohols may be aliphatic compounds such as monohydric and polyhydric alcohols, or aromatic compounds such as phenols and naphthols. The aromatic alcohols from which the esters may be derived are illustrated by the following specific examples: phenol, beta-naphthol, alpha-naphthol, cresol, resorcinol, catechol, p,p'-dihydroxybiphenyl, 2-chlorophenol, 2,4-dibutylphenol, etc.

The alcohols may contain 2, or about 3, or about 4, up to about 40 aliphatic carbon atoms, or to about 30, or to about 24 carbon atoms. They may be monohydric alcohols such as methanol, ethanol, isooctanol, dodecanol, cyclohexanol, etc. In one embodiment, the alcohols are polyhydric alcohols, such as alkylene polyols. The polyhydric alcohols generally contain from 2 to about 40, or to about 20 carbon atoms; and preferably from 2 to about 10, or to about 6 hydroxy groups. Examples of polyhydric alcohols include ethylene glycol, diethylene glycol, triethylene glycol, propylene glycol, dipropylene glycol, tripropylene glycol, glycerol, erythritol, dierythritol, trierythritol, pentaerythritol, dipentaerythritol, tripentaerythritol, butane diol, hexane diol, trimethylolpropane, neopentyl glycol, triglycerine, cyclohexane diol, and sugars such as sorbitol, arabitol, mannitol, sucrose, fructose, and glucose. In one embodiment, the alcohols include erythritol, pentaerythritol, trimethylolpropane, neopentylglycol, triglycerin, and a sugar.

The reaction product of the hydrocarbyl-substituted succinic acylating agent and the alcohol may be prepared by any of several known methods. One method involves reacting the succinic acylating agents described above with one or more alcohols or phenols in ratios from about 0.5 equivalent to about 4 equivalents of alcohol per equivalent of acylating agent. The reaction is usually carried out at a temperature above about 100° C., preferably between 150° C. and 300° C. The water formed as a by-product is removed by distillation as the esterification proceeds. The preparation of useful esters is described in U.S. Pat. Nos. 3,522,179 and 4,234,435.

In one embodiment, the hydrocarbyl-substituted succinic acylating agent is reacted with an alcohol and ammonia or an amine. The amines are described below. In one embodiment, the amines are a polyamine.

The ammonia or amine is added in an amount sufficient to neutralize any nonesterified carboxyl groups. In one embodiment, about 1.0 to 2.0 equivalents, or to 1.8 equivalents of alcohols, and about 0.02 up to about 0.3, or to about 0.25 equivalent of ammonia or amine is reacted with each equivalent of acylating agent.

In another embodiment, the succinic acid acylating agent may be reacted simultaneously with both the alcohol and the amine. There is generally at least about 0.01 equivalent of the alcohol and at least about 0.01 equivalent of the ammonia or amine although the total amount of equivalents of the combination should be at least about 0.5 equivalent per equivalent of acylating agent. These reaction products are known in the art, and the preparation of a number of these derivatives is described in, for example, U.S. Pat. Nos. 3,957,854 and 4,234,435 which are hereby incorporated by reference.

The reaction products of succinic acylating agents, alcohols and optionally ammonia or amines and methods of making the same are known in the art and are disclosed in U.S. Pat. Nos. 3,219,666; 3,381,022; 3,522,179; and 4,234, 435 which are hereby incorporated by reference for their disclosures of the preparation of carboxylic ester dispersants.

(c) Amines

The above-described succinic acylating agents may also be reacted with amines. The reaction products of the hydrocarbyl acylating agent and the amine may be amide, imide, imidazoline, amidine, ester, oxazoline, ammonium salt or mixtures thereof. When the amine is other than a hydroxyamine, then the reaction product may be amide, imide, amidine, ammonium salt or mixture thereof.

The amines may be monoamines or polyamines. In one embodiment, the amine is a polyamine, such as a polyethylene polyamine, an amine bottom or an amine condensate. The amines may be aliphatic, cycloaliphatic, aromatic, or heterocyclic, including aliphatic-substituted cycloaliphatic, aliphatic-substituted aromatic, aliphatic-substituted heterocyclic, cycloaliphatic-substituted aliphatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted alicyclic, and heterocyclic-substituted aromatic amines and may be saturated or unsaturated.

The monoamines have hydrocarbyl groups each independently containing from 1, or about 2 to about 24 or to about 12, or to about 6 carbon atoms in each hydrocarbyl group. In one embodiment, the hydrocarbyl group is an alkyl group. Examples of monoamines useful in the present invention include methylamine, ethylamine, propylamine, butylamine, cyclopentylamine, cyclohexylamine, octylamine, dodecylamine, allylamine, cocoamine, stearylamine, and laurylamine. Examples of secondary amines include dimethylamine, diethylamine, dipropylamine, dibutylamine, dicyclopentylamine, dicyclohexylamine, methylbutylamine, ethylhexylamine, etc. Tertiary amines include trimethylamine, tributylamine, methyldiethylamine, ethyldibutylamine, etc.

In one embodiment, the amine may be a hydroxyamine. Typically, the hydroxyamines are primary, secondary or tertiary alkanolamines or mixtures thereof. Such amines can be represented by the formulae:

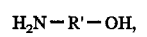

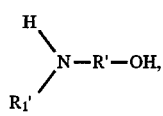

and

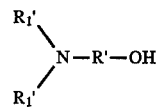

wherein each $R'_1$ is independently a hydrocarbyl group of one to about eight carbon atoms or hydroxyhydrocarbyl group of one to about eight carbon atoms, or to about four, and R' is a divalent hydrocarbyl group of about two to about 18 carbon atoms, preferably two to about four. The group —R'—OH in such formulae represents a hydroxyhydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. Where two $R'_1$ groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(lower hydroxy alkyl)-morpholines, -thiomorpholines, -piperidines, -oxazolidines, -thiazolidines and the like. Typically, however, each $R'_1$ is independently a methyl, ethyl, propyl, butyl, pentyl or hexyl group.

In one embodiment, the alkanolamines are represented by the formula

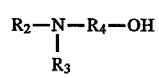

wherein $R_2$ and $R_3$ are each independently alkyl or hydroxyalkyl groups having from 1 to about 10, or to about 6, or to about 4 carbon atoms. $R_4$ is preferably an alkylene group having from 1, or about 2 up to about 10 or to about 4 carbon atoms. In another embodiment, $R_4$ contains 2 or 3 carbon atoms. In one embodiment, $R_2$ and $R_3$ are each independently a methyl, ethyl, propyl or butyl group.

Examples of these hydroxyamines include mono-, di- and triethanolamine, diethyl ethanolamine, di(3-hydroxypropyl) amine, N-(3-hydroxybutyl)amine, N-(4-hydroxybutyl) amine, N,N-di(2-hydroxypropyl)amine, N-(2-hydroxyethyl) morpholine and its thioanalog, N-(2-hydroxyethyl) cyclohexyl amine, N-(3-hydroxycyclopentyl) amine, ortho-, meta-, and para-aminophenol, N-(hydroxyethyl) piperazine, N,N'-di(hydroxyethyl)piperazine, and the like. Preferred amines are dimethylethanolamine and diethylethanolamine.

The hydroxyamines can also be an ether N-(hydroxyhydrocarbyl)amine. These are hydroxypoly (hydrocarbyloxy) analogs of the above-described hydroxyamines (these analogs also include hydroxyl-substituted oxyalkylene analogs). Such N-(hydroxyhydrocarbyl) amines can be conveniently prepared by reaction of epoxides with afore-described amines and can be represented by the formulae:

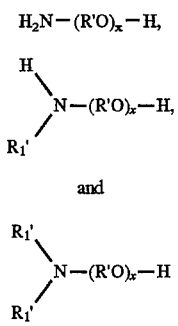

wherein x is a number from about 2 to about 15 and $R_1'$ and R' are as described above. $R'_1$ may also be a hydroxypoly (hydrocarbyloxy) group.

In one embodiment, the reaction of the hydroxyamine and the hydrocarbyl substituted acylating agent is carried out under ester forming conditions and the product thus formed is an ester or ester/salt. The ester/salt may be an internal or external salt. In another embodiment, the reaction product is a mixture of internal and external salts. The external salt is the ionic linkage formed between the acylating agent and the nitrogen atom from the hydroxyamine, the amine being not otherwise bonded to the acylating agent. The internal salt is the ionic salt linkage between the carboxylic acylating agent and the nitrogen atom of the hydroxyamine where the acylating agent and hydroxyamine are also bonded together through a nonsalt linkage (e.g., an ester linkage). Generally, the reaction is carried out at a temperature in the range of about 50° C. to about 150° C.; but usually at a temperature below a 100° C.

The reaction products made by reacting a carboxylic acylating agent and a hydroxyamine which are useful surfactants are described in U.S. Pat. Nos. 4,329,249; 4,368,133; 4,435,297; 4,447,348; and 4,448,703. These patents are incorporated by reference for their disclosure to the reaction products of carboxylic acylating agents and hydroxyamines as well as methods for making the same.

Suitable amines also include polyoxyalkylene polyamines, e.g., polyoxyalkylene diamines and polyoxyalkylene triamines, having average molecular weights ranging from about 200, or about 400 up to 4000, or to about 2000. Illustrative examples of these polyoxyalkylene polyamines may be characterized by the formulae: $NH_2$-Alkylene $(O-Alkylene)_m NH_2$, wherein m has a value of about 3 to 70 and preferably about 10 to 35; and $R(Alkylene (O-Alkylene)_n NH_2)_{3-6}$, wherein n is such that the total value is from about 1 to 40 with the proviso that the sum of all of the n+s is from about 3 to about 70 and generally from about 6 to about 35 and R is a polyvalent saturated hydrocarbon radical of up to 10 carbon atoms having a valence of 3 to 6. The alkylene groups may be straight or branched chains and contain from 1 to 7 carbon atoms and usually from 1 to 4 carbon atoms. The various alkylene groups present may be the same or different.

The polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Texaco Chemical Company, Inc. under the trade name "Jeffamines D-230, D-400, D-1000, D-2000, T-403, etc."

U.S. Pat. Nos. 3,804,763 and 3,948,800 are expressly incorporated herein by reference for their disclosure of such polyoxyalkylene polyamines and process for acylating them with carboxylic acid acylating agents which processes can be applied to their reaction with the acylating reagents used in this invention.

The amine which reacts with the succinic acylating agent may be a polyamine. The polyamine may be aliphatic, cycloaliphatic, heterocyclic or aromatic. Examples of the polyamines include alkylene polyamines, hydroxy containing polyamines, arylpolyamines, and heterocyclic polyamines.

Alkylene polyamines are represented by the formula

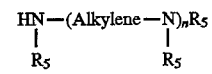

wherein n has an average value from 1, or about 2 to about 10, or to about 7, or to about 5, and the "Alkylene" group has from 1, or about 2 to about 10, or to about 6, or to about 4 carbon atoms. Each $R_5$ is independently hydrogen, or an aliphatic or hydroxy-substituted aliphatic group of up to about 30 carbon atoms. In one embodiment, $R_5$ is defined the same as $R'_1$.

Such alkylenepolyamines include methylenepolyamines, ethylenepolyamines, butylenepolyamines, propylenepolyamines, pentylenepolyamines, etc. The higher homologs and related heterocyclic amines such as piperazines and N-aminoalkyl-substituted piperazines are also included. Specific examples of such polyamines are ethylenediamine, diethylenetriamine (DETA), triethylenetetramine (TETA), tris-(2-aminoethyl)amine, propylenediamine, trimethylenediamine, tripropylenetetramine, tetraethylenepentamine, hexaethyleneheptamine, pentaethylenehexamine, etc.

Higher homologs obtained by condensing two or more of the above-noted alkylene amines are similarly useful as are mixtures of two or more of the aforedescribed polyamines.

Ethylenepolyamines, such as those mentioned above, are useful. Such polyamines are described in detail under the heading Ethylene Amines in Kirk Othmer's "Encyclopedia of Chemical Technology", 2d Edition, Vol. 7, pages 22–37, Interscience Publishers, New York (1965). Such polyamines are most conveniently prepared by the reaction of ethylene dichloride with ammonia or by reaction of an ethylene imine with a ring opening reagent such as water, ammonia, etc. These reactions result in the production of a complex mixture of polyalkylenepolyamines including cyclic condensation products such as the aforedescribed piperazines. Ethylenepolyamine mixtures are useful.

Other useful types of polyamine mixtures are those resulting from stripping of the above-described polyamine mixtures to leave as residue what is often termed "polyamine bottoms". In general, alkylenepolyamine bottoms can be characterized as having less than two, usually less than 1% (by weight) material boiling below about 200° C. A typical sample of such ethylene polyamine bottoms obtained from the Dow Chemical Company of Freeport, Tex. designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably DETA), 0.72% TETA, 21.74% tetraethylene pentamine and 76.61% pentaethylenehexamine and higher (by weight). These alkylenepolyamine bottoms include cyclic condensation products such as piperazine and higher analogs of diethylenetriamine, triethylenetetramine and the like.

These alkylenepolyamine bottoms can be reacted solely with the acylating agent or they can be used with other amines, polyamines, or mixtures thereof.

Another useful polyamine is a condensation reaction between at least one hydroxy compound with at least one polyamine reactant containing at least one primary or secondary amino group. The hydroxy compounds are preferably polyhydric alcohols and amines. The polyhydric alcohols are described above. Preferably the hydroxy compounds are polyhydric amines. Polyhydric amines include any of the above-described monoamines reacted with an alkylene oxide (e.g., ethylene oxide, propylene oxide, butylene oxide, etc.) having two to about 20, or to about four carbon atoms. Examples of polyhydric amines include tri(hydroxypropyl)amine, tris-(hydroxymethyl) amino methane, 2-amino-2-methyl-1,3-propanediol, N,N,N',N'-tetrakis(2-hydroxypropyl)ethylenediamine, and N,N,N',N'-tetrakis(2-hydroxyethyl)ethylenediamine, preferably tris(hydroxymethyl)aminomethane (THAM).

Polyamines, which react with the polyhydric alcohol or amine to form the condensation products or condensed amines, are described above. Preferred polyamine reactants include triethylenetetramine (TETA), tetraethylenepentamine (TEPA), pentaethylenehexamine (PEHA), and mixtures of polyamines such as the above-described "amine bottoms".

The condensation reaction of the polyamine reactant with the hydroxy compound is conducted at an elevated temperature, usually about 60° C. to about 265° C., (preferably about 220° C. to about 250° C.) in the presence of an acid catalyst.

The amine condensates and methods of making the same are described in U.S. Pat. No. 5,053,152 and PCT publication WO86/05501 which are incorporated by reference for their disclosure to the condensates and methods of making. The preparation of such polyamine condensates may occur as follows: A 4-necked 3-liter round-bottomed flask equipped with glass stirrer, thermowell, subsurface $N_2$ inlet, Dean-Stark trap, and Friedrich condenser is charged with: 1299 grams of HPA Taft Amines (amine bottoms available commercially from Union Carbide Co. with typically 34.1% by weight nitrogen and a nitrogen distribution of 12.3% by weight primary amine, 14.4% by weight secondary amine and 7.4% by weight tertiary amine), and 727 grams of 40% aqueous tris(hydroxymethyl)aminomethane (THAM). This mixture is heated to 60° C. and 23 grams of 85% $H_3PO_4$ is added. The mixture is then heated to 120° C. over 0.6 hour. With $N_2$ sweeping, the mixture is then heated to 150° C. over 1.25 hour, then to 235° C. over 1 hour more, then held at 230°–235° C. for 5 hours, then heated to 240° C. over 0.75 hour, and then held at 240°–245° C. for 5 hours. The product is cooled to 150° C. and filtered with a diatomaceous earth filter aid. Yield: 84% (1221 grams).

In another embodiment, the polyamines are hydroxy-containing polyamines. Hydroxy-containing polyamine analogs of hydroxymonoamines, particularly alkoxylated alkylenepolyamines (e.g., N,N(diethanol)ethylenediamine) may also be used. Such polyamines may be made by reacting the above-described alkylenepolyamines with one or more of the above-described alkylene oxides. Similar alkylene oxide-alkanolamine reaction products may also be used such as the products made by reacting the aforedescribed primary, secondary or tertiary alkanolamines with ethylene, propylene or higher epoxides in a 1:1 to 1:2 molar ratio. Reactant ratios and temperatures for carrying out such reactions are known to those skilled in the art.

Specific examples of alkoxylated alkylene polyamines include N-(2-hydroxyethyl)ethylenediamine, N,N-bis(2-hydroxyethyl)ethylenediamine, 1-(2-hydroxyethyl) piperazine, mono(hydroxypropyl)substituted tetraethylenepentamine, N-(3-hydroxybutyl)tetramethylene diamine, etc. Higher homologs obtained by condensation of the above-illustrated hydroxy-containing polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

In another embodiment, the amine is a heterocyclic polyamine. The heterocyclic polyamines include aziridines, azetidines, azolidines, pyridines, pyrroles, indoles, piperidines, imidazoles, imidazoles, piperazines, isoindoles, purines, morpholines, thiomorpholines, N-aminoalkylmorpholines, N-aminoalkylthiomorpholines, N-aminoalkylpiperazines, N,N'-diaminoalkylpiperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkyl-substituted piperidines, piperazine, aminoalkyl-substituted piperazines, morpholine, aminoalkyl-substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-aminopropylmorpholine, N-aminoethylpiperazine, and N,N'-diaminoethylpiperazine. Hydroxy heterocyclic polyamines are also useful. Examples include N-(2-hydroxyethyl)cyclohexylamine, 3-hydroxycyclopentylamine, parahydroxyaniline, N-hydroxyethylpiperazine, and the like.

Hydrazine and substituted-hydrazine can also be reacted with the hydrocarbyl-substituted succinic acylating agent. At least one of the nitrogens in the hydrazine must contain a hydrogen directly bonded thereto. Preferably there are at least two hydrogens bonded directly to hydrazine nitrogen and, more preferably, both hydrogens are on the same nitrogen. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy substituted phenyl or lower alkyl substituted phenyl. Specific examples of substituted hydrazines are methylhydrazine, N,N-dimethyl-hydrazine, N,N'-dimethylhydrazine, phenylhydrazine, N-phenyl-N'-ethylhydrazine, N-(para-tolyl)-N'-(n-butyl)-hydrazine, N-(para-nitrophenyl)-hydrazine, N-(para-nitrophenyl)-N-methyl-hydrazine, N,N'-di(para-chlorophenol)-hydrazine, N-phenyl-N'-cyclohexylhydrazine, and the like.

The reaction products of hydrocarbyl-substituted succinic acylating agents and amines and methods for preparing the same are described in U.S. Pat. Nos. 4,234,435; 4,952,328; 4,938,881; 4,957,649; and 4,904,401, their disclosures are hereby incorporated by reference.

The following examples illustrate (i) the reaction products and its salts and methods for preparing the same. Unless otherwise indicated in the following examples, as well as elsewhere in the specification and claims, parts and percentages are by weight, temperature is degrees Celsius and pressure is atmospheric.

EXAMPLE 1

A mixture of 874 parts (2 equivalents) of a polybutenyl ($\overline{M}n=1000$) substituted succinic anhydride and 104 parts (2 equivalents) of neopentyl glycol is maintained at 240°–250° C./30 mm for 12 hours. The residue is a mixture of the esters resulting from the esterification of one and both hydroxy groups of the glycol.

EXAMPLE 2

A mixture of 3225 parts (5.0 equivalents) of the polybutene ($\overline{M}n$=2020, Saponification number=87 (ASTM D-94)) substituted succinic anhydride, 289 parts (8.5 equivalents) of pentaerythritol and 5204 parts of mineral oil is heated at 224°–235° C. for 5.5 hours. The reaction mixture is filtered at 130° C. to yield an oil solution of the desired product.

EXAMPLE 3

A mixture of 1000 parts of polybutene having a number average molecular weight of about 1000 and 108 parts (1.1 moles) of maleic anhydride is heated to about 190° C. and 100 parts (1.43 moles) of chlorine are added beneath the surface over a period of about 4 hours while maintaining the temperature at about 185°–190° C. The mixture then is blown with nitrogen at this temperature for several hours, and the residue is the desired polybutenyl-substituted succinic acylating agent.

A solution of 1000 parts of the above-prepared acylating agent in 857 parts of mineral oil is heated to about 150° C. with stirring, and 109 parts (3.2 equivalents) of pentaerythritol are added with stirring. The mixture is blown with nitrogen and heated to about 200° C. over a period of about 14 hours to form an oil solution of the desired carboxylic ester intermediate. To the intermediate, there are added 19.25 parts (0.46 equivalent) of a commercial mixture of ethylene polyamines having an average of about 3 to about 10 nitrogen atoms per molecule. The reaction mixture is stripped by heating at 205° C. with nitrogen blowing for 3 hours and filtered. The filtrate is an oil solution (45% 100 neutral mineral oil) of the desired amine-modified carboxylic ester which contains 0.35% nitrogen.

EXAMPLE 4

A mixture of 3660 parts (6 equivalents) of a polybutenyl ($\overline{M}n$=1845, saponification number =87 (ASTM D94)) substituted succinic anhydride in 4664 parts of diluent oil is prepared and heated at about 110° C. whereupon nitrogen is blown through the mixture. To this mixture there are then added 210 parts (5.25 equivalents) of an alkylene polyamine mixture, comprising 80% of ethylene polyamine bottoms from Union Carbide and 20% of a commercial mixture of ethylene polyamines corresponding in empirical formula to diethylene triamine, over a period of one hour and the mixture is maintained at 110° C. for an additional 0.5 hour. The polyamine mixture is characterized as having an equivalent weight of about 43.3. After heating for 6 hours at 155° C. while removing water, a filtrate is added and the reaction mixture is filtered at about 150° C. The filtrate is the oil solution of the desired product.

EXAMPLE 5

2240 parts of polybutenyl ($\overline{M}n$=950) substituted succinic anhydride are heated to a temperature in the range of 110°–116° C. 174 parts of morpholine are then added dropwise to the anhydride. After completion of the addition of morpholine, the resulting mixture is maintained at a temperature of 116°–126° C. for two hours. 234 parts of diethylethanolamine are then added dropwise while the temperature is maintained at 116°–126° C. After completion of the addition of diethylethanolamine, the resulting mixture is maintained at 116°–126° C. for 50 minutes with stirring. The resulting product is an amide/salt.

EXAMPLE 6

A mixture of 1100 parts of the polybutenyl-substituted succinic anhydride used in Example 5 and 100 parts of Carbowax 200 (a product of Union Carbide identified as a polyethylene glycol having a molecular weight of 200) are heated to and then maintained at a temperature of 123°–134° C., maintained at said temperature for 2 hours, then cooled to 100° C. 117 parts of diethylethanolamine are added to the resulting product over a 0.2 hour period while maintaining the temperature at 100° C. The mixture is then cooled to room temperature. The product is an ester/salt.

EXAMPLE 7

A mixture of 1100 parts of the polybutenyl-substituted succinic anhydride used in Example 5 and 34 parts of pentaerythritol are heated to a temperature of 125°–160° C., maintained at said temperature for 4 hours, then adjusted to 130° C. 117 parts of diethylethanolamine are added to the mixture. The temperature is maintained at 100°–130° C. for 1 hour. The resulting product is then cooled to room temperature. The product is an ester/salt.

EXAMPLE 8

A mixture of 2240 parts of the polybutenyl-substituted succinic anhydride used in Example 5 and 62 parts of ethylene glycol are heated to a temperature in the range of 116°–120° C., then maintained at said temperature for 5 hours. The temperature of the mixture is then increased to a temperature in the range of 138°–146° C. and maintained at said increased temperature for an additional 4.5 hours. The temperature of the mixture is then decreased to 115° C. over a period of 0.5 hour. 122 parts of monoethanolamine are added to the mixture over a period of 0.5 hour while maintaining the temperature at 115°–120° C. The mixture is then stirred for an additional 0.5 hour while maintaining the temperature at 115° 120° C. The resulting product is an ester/salt.

EXAMPLE 9

A mixture of 917 parts of diluent oil, 40 parts of diatomaceous earth filter aid, 10 parts of caustic soda, 0.2 part of a silicone-based anti-foam agent, 135 parts of 3-amino-1,2,4-triazole, and 6.67 parts of a commercial polyethylene polyamine mixture containing 33.5% nitrogen and substantially corresponding to tetraethylene pentamine are heated to a temperature of 121° C. with stirring. 1000 parts of the polybutenyl-substituted succinic anhydride used in Example 5 are slowly added to the mixture over a period of about one hour, and during such addition the temperature of the mixture is increased from 121° C. to 154° C. The mixture is then maintained at a temperature of 154°–160° C. with nitrogen blowing for 12 hours. The mixture is then cooled to 138°–149° C. and filtered. A final oil adjustment is made to adjust the product to a 45% by weight diluent oil.

EXAMPLE 10

A mixture of 2644 parts of the polybutenyl-substituted succinic anhydride used in Example 5 and 75 parts of ethylene glycol are heated to a temperature of 120° C., and maintained at said temperature for 4 hours. The temperature of the mixture is then increased to 160°–170° C., maintained at said temperature for 2 hours, then reduced to 120° C. 281 parts of diethylethanolamine are added to the mixture over a 15-minute period. The temperature of the mixture is maintained at 115°–120° C. for 1 hour. The mixture is then cooled to room temperature to provide the desired product.

EXAMPLE 11

A mixture of 2240 parts of the polybutenyl-substituted succinic anhydride used in Example 5 and 86 parts of piperazine are heated to a temperature of 116°–126° C. and maintained at said temperature for 2 hours. 234 parts of diethylethanolamine are added dropwise to the mixture. The temperature is maintained at 116°–126° C. for 50 minutes. The resulting product is then cooled to room temperature.

EXAMPLE 12

A reaction vessel is charged with 1000 parts of polybutenyl ($\overline{M}n$=950) substituted succinic anhydride. The anhydride is heated with stirring to about 90° C. Then, N,N-diethylethanolamine (209 parts) is slowly added over a two hours. Heating is continued for an additional hour at 90° C. The heated reaction mixture is cooled to room temperature to provide the desired product.

EXAMPLES 13–21

EXAMPLEs 13–21 are prepared by the procedure described in Example 12. The carboxylic acylating agent is reacted with the alkanolamine on an equal molar basis.

than two, aliphatic or alicyclic groups having at least about 6 (usually at least about 30, or at least about 50) carbon atoms and up to about 400 carbon atoms, or to about 300, or to about 200. These groups may be derived from the above described polyalkenes. In one embodiment, the hydroxyaromatic compound is a phenol substituted with an aliphatic or alicyclic hydrocarbon-based group having an $\overline{M}n$ of about 420 to about 10,000.

In one embodiment, the hydroxyaromatic compounds are those of the formula

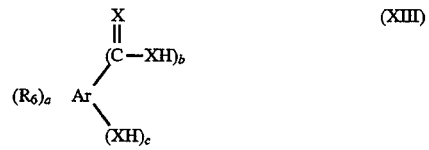

(XIII)

wherein $R_6$ is hydrogen or an aliphatic hydrocarbyl group preferably derived from the above-described polyalkenes, a is a number in the range of one to about four, usually one or two, Ar is an aromatic group, each X is independently sulfur or oxygen, preferably oxygen, b is a number in the range from zero to about four, usually one or two, c is a number in the range of one to about four, usually one to two, with the proviso that the sum of a, b and c does not exceed the number of valences of Ar.

$R_6$ is hydrogen, or said hydrocarbyl group having from 1 to about 100 carbon atoms such as an alkyl having from 1 or about 7 to about 30, or to about 20 carbon atoms, an alkenyl group having about 2, or to about 8 to about 30 or to about 20 carbon atoms, a cycloalkyl group having from

| EXAMPLE | CARBOXYLIC ACYLATING AGENT | ALKANOLAMINE |
|---|---|---|
| 13 | Hexadecenyl Succinic Anhydride | N,N'-dimethylethanolamine |
| 14 | Tetrapropenyl Succinic Anhydride | Diethanolamine |
| 15 | Polybutenyl (Mn = 1690) Succinic Anhydride | Triethanolamine |
| 16 | Hexadecenyl Succinic Anhydride | N,N'-diethylethanolamine |
| 17 | C$_{16-18}$ Substituted Succinic Anhydride | N,N'-diethylethanolamine |
| 18 | Polybutenyl (Mn = 950) Succinic Anhydride | Aminopropanol |
| 19 | Polybutenyl (Mn = 950) Succinic Anhydride | N,N'-dimethylethanolamine |
| 20 | Isostearylpentaethylene glycol-Acetic Acid | Ethanolamine |
| 21 | Polybutenyl (Mn = 950) Salicylic Acid | N,N'-diethylethanolamine |

A-(ii) Reaction products of Hydroxyaromatic Compounds

The compositions of the present invention may also include (ii) at least one reaction product of a hydroxyaromatic compound, an aldehyde, and an amine. These reaction products are generally referred to as Mannich reaction products. The reaction may occur from room temperature to 225° C., usually from 50° to about 200° C. (75° C. –150° C. most preferred), with the amounts of the reagents being such that the molar ratio of hydroxyaromatic compound to aldehyde to amine is in the range from about (1:1:1) to about (1:3:3).

The first reagent is a hydroxyaromatic compound. This term includes phenols (which are preferred), carbon-, oxygen-, sulfur- and nitrogen-bridged phenols and the like as well as phenols directly linked through covalent bonds (e.g. 4,4'-bis(hydroxy)biphenyl), hydroxy compounds derived from fused-ring hydrocarbon (e.g., naphthols and the like); and polyhydroxy compounds such as catechol, resorcinol and hydroquinone. Mixtures of one or more hydroxyaromatic compounds may be used as the first reagent.

In one embodiment, the hydroxyaromatic compounds are those substituted with at least one, and preferably not more than about 4, or to about 5, to about 10, or to about 7 carbon atoms, an aromatic group having from about 6 to about 30 carbon atoms, an aromatic-substituted alkyl group or alkyl-substituted aromatic group having a total of from about 7 to about 30, to about 12 carbon atoms. In one embodiment, the hydrocarbyl substituent is an alkyl group having from 7 to about 20, or to about 14 carbon atoms. In one embodiment, the $R_6$ group is a hydrocarbyl group that is directly bonded to the aromatic group Ar. Examples of $R_6$ groups include substituents derived from any of the polyalkenes described above. Examples of useful polyalkenes include polyethylenes, polypropylenes, polyisobutylenes, ethylene-propylene copolymers, chlorinated olefin polymers and oxidized ethylene-propylene copolymers.

Examples of suitable hydrocarbyl-substituted hydroxyaromatic compounds include the various naphthols, and more preferably the various alkyl-substituted catechols, resorcinols, and hydroquinones, the various xylenols, the various cresols, aminophenols, and the like. Examples of various suitable compounds include heptylphenol, octylphenol, nonylphenol, decylphenol, dodecylphenol, tetrapropylphenol, eicosylphenol, and the like.

Dodecylphenol, tetrapropylphenol and heptylphenol are especially preferred. Examples of suitable hydrocarbyl-substituted thiol-containing aromatics include heptylthiophenol, octylthiophenol, nonylthiophenol, dodecylthiophenol, tetrapropylthiophenol, and the like. Examples of suitable thiol- and hydroxyaromatic compounds include dodecylmonothio-resorcinol, 2-mercaptoalkylphenol where the alkyl group is as set forth above.

While the term "phenol" is used herein, it is to be understood that this term is not intended to limit the aromatic group of the phenol to benzene. Accordingly, it is to be understood that the aromatic group as represented by "Ar", as well as elsewhere in other formulae in this specification and in the appended claims, may be mononuclear or polynuclear. The polynuclear groups can be of the fused type wherein an aromatic nucleus is fused at two points to another nucleus such as found in naphthyl, anthranyl, etc. The polynuclear group can also be of the linked type wherein at least two nuclei (either mononuclear or polynuclear) are linked through bridging linkages to each other. These bridging linkages can be chosen from the group consisting of alkylene linkages, ether linkages, keto linkages, sulfide linkages, polysulfide linkages of 2 to about 6 sulfur atoms, etc.

The number of aromatic nuclei, fused, linked or both, in Ar can play a role in determining the integer values of a and b. For example, when Ar contains a single aromatic nucleus, the sum of a and b is from 2 to 6. When Ar contains two aromatic nuclei, the sum of a and b is from 2 to 10. With a tri-nuclear Ar moiety, the sum of a and b is from 2 to 15. The value for the sum of a and b is limited by the fact that it cannot exceed the total number of displaceable hydrogens on the aromatic nucleus or nuclei of Ar.

The aromatic group Ar may have the same structure as any of the aromatic groups Ar discussed below. Examples of the aromatic groups that are useful herein include the polyvalent aromatic groups derived from benzene, naphthalene, anthracene, etc., preferably benzene. Specific examples of Ar groups include phenylenes and naphthylene, e.g., methylphenylenes, ethoxyphenylenes, isopropylphenylenes, hydroxyphenylenes, dipropoxynaphthylenes, etc.

Within this group of hydroxyaromatic compounds, a useful class of hydroxycarboxylic acids are those of the formula

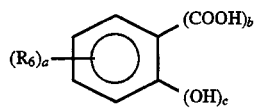

wherein $R_6$ is defined above, a is a number in the range of from one to about four, preferably one to about three; b is a number in the range of one to about four, preferably four to about two, c is a number in the range of zero to about four, preferably one to about two, and more preferably one; with the proviso that the sum of a, b and c does not exceed 6. in one embodiment, b and c are each one and the carboxylic acid is a salicylic acid.

The salicylic acids preferably are hydrocarbyl-substituted salicylic acids. The salicylic acids have the hydrocarbyl substituents derived from the above-described polyalkenes, particularly polymerized lower 1-mono-olefins such as polyethylene, polypropylene, polybutylene, ethylene/propylene copolymers and the like.

The above hydroxyaromatic compounds are well known or can be prepared according to procedures known in the art.

Carboxylic acids of the type illustrated by these formulae are known and disclosed, for example, in U.S. Pat. Nos. 2,197,832; 2,197,835; 2,252,662; 2,252,664; 2,714,092; 3,410,798; and 3,595,791.

The second reagent is a hydrocarbon-based aldehyde, preferably a lower aliphatic aldehyde. Suitable aldehydes include formaldehyde, benzaldehyde, acetaldehyde, the butyraldehydes, hydroxybutyraldehydes and heptanals, as well as aldehyde precursors which react as aldehydes under the conditions of the reaction such as paraformaldehyde, paraldehyde, formalin and methal. Formaldehyde and its precursors and reaction synthons (e.g., paraformaldehyde, trioxane) are preferred. Mixtures of aldehydes may be used as the second reagent.

The third reagent is any amine described above. Preferably the amine is any polyamine as described above.

The reaction products of a hydrocarbyl-substituted hydroxyaromatic compounds, aldehydes, and amines are described in the following patents: U.S. Pat. No. 3,980,569 and U.S. Pat. No. 4,454,059 the disclosures of which are herein incorporated by reference.

The following examples illustrate reaction product A-(ii) and methods of making the same.

EXAMPLE 22

A solution of 4576 parts (4.4 equivalents) of the polybutenylphenol having a molecular weight of about 885, in 3226 parts of mineral oil is heated to 55° C. under nitrogen, with stirring, and 18 parts (0.22 equivalent) of 50% aqueous sodium hydroxide solution is added. The mixture is stirred for 10 minutes and then 320 parts (9.68 equivalents) of paraformaldehyde is added. The mixture is heated at 70°–80° C. for 13 hours, and is then cooled to 60° C. whereupon 20 parts (0.33 equivalent) of acetic acid is added. The mixture is then heated at 110° C. for 6 hours while being blown with nitrogen to remove volatile materials. Nitrogen blowing is continued at 130° C. for an additional 6 hours, after which the solution is filtered at 120° C., using diatomaceous earth.

To the above alkylphenol-formaldehyde concentrate, at 65° C., is added 184 parts (4.48 equivalents) of the polyethylene polyamine mixture containing about 3–7 nitrogen atoms per molecule and about 34.5% by weight nitrogen. The mixture is heated at 110°–135° C. over 4 hours and is then blown with nitrogen at 150°–160° C., for 5 hours as volatiles are removed. Mineral oil, 104 parts, is added and the mixture is filtered at 150° C., using diatomaceous earth, to yield the desired product as a 60% solution in mineral oil containing 1.80% nitrogen.

EXAMPLE 23

To 366 parts (0.2 equivalent) of the alkylphenolformaldehyde condensate of Example 22 is added at 60° C., with stirring, 43.4 parts (0.3 equivalent) of N-(3-aminopropyl) morpholine. The mixture is heated at 110°–130° C., with nitrogen blowing, for 5 hours. It is then stripped of volatiles at 170° C./16 torr, and filtered using diatomaceous earth. The filtrate is the desired product (62.6% solution in mineral oil) containing 1.41% nitrogen.

EXAMPLE 24

Following the procedure of Example 23, a reaction product is prepared from 366 parts (0.2 equivalent) of the alkylphenol-formaldehyde condensate of Example 22 and 31.5 parts (0.3 equivalent) of diethanolamine. It is obtained as a 62.9% solution in mineral oil, containing 0.70% nitrogen.

EXAMPLE 25

To a mixture of 1560 parts (1.5 equivalents) of the polybutenylphenol of Example 22 and 12 parts (0.15 equivalent) of 50% aqueous sodium hydroxide solution is added at 68° C., with stirring, 99 parts (3 equivalents) of paraformaldehyde. The addition period is 15 minutes. The mixture is then heated to 88° C. and 100 parts of a mixture of isobutyl and primary amyl alcohols is added. Heating at 85°–88° C. is continued for 2 hours and then 16 parts of glacial acetic acid is added and the mixture is stirred for 15 minutes and vacuum stripped at 150° C. To the residue is added 535 parts of mineral oil, and the oil solution is filtered to yield the desired intermediate.

To 220 parts (0.15 equivalent) of the intermediate prepared as described above is added 7.5 parts (0.15 equivalent) of hydrazine hydrate. The mixture is heated to 80°–105° C. and stirred at that temperature for 4 hours. Acetic acid, 0.9 parts, is then added and stirring is continued at 95°–125° C. for an additional 6 hours. A further 7.5 part portion of hydrazine hydrate is added and heating and stirring are continued for 8 hours, after which the product is stripped of volatiles under vacuum at 124° C. and 115 parts of mineral oil is added. Upon filtration, the desired product (50% solution in mineral oil) is obtained; it contains 1.19% nitrogen.

Compositions

The compositions generally contain an emulsifying amount of (A) the reaction products (i) or (ii). In one embodiment, the composition contains at least about 0.1 pounds per barrel of the reaction products (A). The reaction products may be present in an amount from about 0.5, or about 1, or about 2 up to about 10, or to about 8, or to about 5 pounds per barrel (ppb).

The compositions of the present invention include a major amount of a mixture of brine and liquid oil, as well as (A) the reaction products (i) or (ii) and optionally, (B) esters of carboxy-containing interpolymers, (C) weighting agents, and (D) organophilic clays.

Brine—Liquid Mixtures

The brine is present in a mixture with a liquid oil. In one embodiment, the brine is present in the mixture in an amount from about 5, or about 10, or about 15, or about 25 up to about 90, or to about 75, or to about 55 parts by volume. In this embodiment, the liquid oil is present in the mixture in an amount from about 10, or about 25, or about 45 up to about 95, or to about 90, or to about 85, or to about 75 parts by volume. The total parts by volume of brine plus the total parts by volume of liquid oil is 100 parts by volume of the mixture. In one embodiment, the brine is a discontinuous phase and the liquid oil is a continuous phase. In another embodiment, the mixture contains a major amount of a liquid oil, preferably from about 65, or about 70, or about 75 up to about 90, or to about 85 parts by volume. In this embodiment, the brine is present in an amount from about 10, or about 15 up to about 35, or about 20, or about 25 parts by volume of the mixture.

The brine useful in the compositions and methods of the present invention may be naturally occurring field brine or one formulated by various salts. The salts include calcium chloride, magnesium chloride, sodium chloride potassium chloride, zinc chloride and zinc bromide. The calcium chloride is generally present in an amount from 1% to about 40% by weight of the brine. The magnesium chloride is generally present in an amount from about 0.5% to about 24% by weight of the brine. The sodium chloride is generally present in an amount from about 1% to about 27% by weight of the brine. The potassium chloride is present in an amount from about 0.5% to about 24% by weight of the brine. The zinc chloride or zinc bromide is generally present in an amount from about 0.5% to about 80% by weight of the brine.

The mixture also contains a liquid oil which includes a liquid hydrocarbon, or a synthetic oil. Examples of these liquid hydrocarbons include petroleum oils, such as oils of lubricating viscosity, crude oils, diesel oils, mineral seal oils, kerosenes, fuel oils, white oils, and aromatic oils. Liquid oils also include natural oils, such as animal oils, vegetable oils, mineral lubricating oils, solvent or acid treated mineral oils, oils derived from coal or shale, and synthetic oils. Synthetic oils include hydrocarbon oils and halo-substituted hydrocarbon oils such as polymerized and interpolymerized olefins, for example polybutylenes, polypropylenes,propyleneisobutylene copolymers, chlorinated polybutylenes, poly(1-hexenes), poly(1-octenes), poly(1-decenes); alkyl benzenes, such as dodecylbenzenes, tetradecylbenzenes, dinonylbenzenes, di-(2-ethylhexyl)benzenes; polyphenyls such as biphenyls, terphenyls, and alkylated polyphenyls; and alkylated diphenyl ethers and alkylated diphenyl sulfides and derivatives, analogs and homologs thereof.

Alkylene oxide polymers and interpolymers and derivatives thereof where terminal hydroxy groups have been modified by esterification, etherification etc. constitute another class of synthetic oils. These are exemplified by polyoxyalkylene polymers prepared by the polymerization of ethylene oxide or propyleneoxide, the alkyl and aryl ethers of these polyoxyalkylene polymers such as methylpolyisopropylene glycol ethers, diphenyl and diethyl ethers of polyethylene glycol;and mono and polycarboxylic esters thereof, for example, the acetic esters, mixed C3–C8 fatty acid esters and C13 Oxo diester of tetra ethylene glycol. Simple aliphatic ethers may be used as synthetic oils, such as, dioctyl ether, didecyl ether, di(2-ethylhexyl) ether.

Another suitable class of synthetic oils comprises the esters of fatty acids such as ethyl oleate, lauryl hexanoate, and decyl palmitate. The esters of dicarboxylic acids such as phthalic acid, succinic acid, maleic acid, azealic acid, sebacic acid, fumaric acid, adipic acid, linoleic acid dimer, malonic acid, alkyl malonic acids, alkenyl malonic acids with a variety of alcohols such as butyl alcohol, hexyl alcohol, dodecyl alcohol, 2-ethylhexyl alcohol, ethylene glycol, diethylene glycol monoethyl ether, propylene glycol. Specific examples of these esters include dibutyl adipate, di(2-ethylhexyl) sebacate, di-n-hexyl fumarate, dioctyl sebacate, diisoctyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethyl-hexanoic acid.

In one embodiment, the liquid oil is a mineral or vegetable oil having a kinematic viscosity from about 3, or about 3.5, or about 4 up to about 15, or to about 11, or to about 10, or to about 9 centistokes at 100° C. Useful mineral oils include 40, 100, 150, 200 and 300 neutral mineral oils. Examples of specific liquid hydrocarbons include No. 2 diesel oil, Exxon ESCAID® 110 (a petroleum distillate comprising 20% aromatics, 56.6% paraffins and 23.4 naphthenes available commercially from ESSO), Total HDF 200, Conoco LVT oil (a mineral oil with the viscosity of 1.8 centistokes at 40° C. available from Conoco Oil Company), and Conoco LVT 200 (a mineral oil with a viscosity of 2.1 centistokes at 40° C.

and less than 0.5% aromatic content, available from Conoco Oil Company).

(B) Esters of Carboxy-Containing Interpolymers

The compositions may additionally contain (B) at least one ester of a carboxy-containing interpolymer or salt thereof. In one embodiment, (B) is included when the composition contains a mixture of brine and liquid oil has from about 40 to about 60 parts by volume of brine and about 60 to about 40 parts by volume of liquid oil. In one embodiment, the mixture is about 50 parts brine and 50 parts liquid oil. (B) is present in an amount from about 1, or about 2 to about 10, or to about 8 pounds per barrel (ppb).

The carboxy-containing interpolymer is prepared by polymerizing an alpha-olefin or vinyl aromatic monomer with an alpha, beta-unsaturated carboxylic acylating agent, provided that when the olefin is vinyl toluene, then the alpha, beta-unsaturated carboxylic acylating agent is a dicarboxylic acylating agent. As used in the specification and claims, the term carboxy-containing refers to polymers which are prepared using a carboxy-containing monomer. The carboxy-containing monomer is polymerized with other monomers to form the carboxy-containing interpolymer. Since the carboxy-containing monomer is incorporated into the polymer backbone, the carboxy groups extend from the polymer backbone, e.g., the carboxy groups are directly attached to the polymer backbone.

The carboxy-containing interpolymers useful in preparing the esters useful in the invention are copolymers, terpolymers, and other interpolymers of alpha, beta-unsaturated carboxylic acylating agents or mixtures of two or more of any of these, and one or more olefins. Carboxylic acylating agents include carboxylic acids, anhydrides, esters (lower alkyl esters containing from 1 to 7 carbon atoms), halides, etc. The olefins are selected from the group consisting of aliphatic-olefins and vinyl aromatic monomers. These compounds serve as a connective moiety for the alpha, beta-unsaturated compounds in forming the carboxy-containing interpolymer.

Suitable aliphatic olefin monomers that are useful in the preparation of the interpolymers of the invention are mono-olefins of about 2, or about 8 to about 30, or to about 24 carbon atoms. Useful olefins have been described above.

Suitable vinyl aromatic monomers which may be polymerized include styrene and the substituted styrenes.

The substituted styrenes include the halo-substituted styrenes (e.g., alpha-halostyrenes), and the hydrocarbyl-substituted styrenes wherein the hydrocarbyl group has from 1 to about 12 carbon atoms. Exemplary of the hydrocarbyl-substituted styrenes are the alpha-methylstyrene, paratert-butylstyrene, alpha-ethylstyrene, and para-lower alkoxy styrene ($C_{1-6}$). Mixtures of two or more vinyl aromatic monomers can be used. Styrene is the preferred vinyl aromatic monomer.

Suitable alpha, beta-unsaturated carboxylic acylating agents include mono-carboxylic (e.g., acrylic, methacrylic and crotonic acylating agents) as well as dicarboxylic acylating agents wherein a carbon-to-carbon double bond is in an alpha, beta-position to at least one of the carboxy functions (e.g., maleic, fumaric, itaconic acid, and citraconic acylating agents, anhydride or lower esters thereof).

A class of preferred alpha, beta-unsaturated dicarboxylic acylating agent includes those compounds corresponding to the formulae:

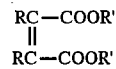

and

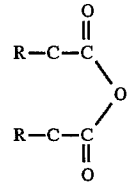

(including the geometric isomers thereof, i.e., cis and trans) wherein each R is independently hydrogen; halogen (e.g., chloro, bromo, or iodo); hydrocarbyl or halogen-substituted hydrocarbyl of up to about 8 carbon atoms, preferably alkyl, alkaryl or aryl; (preferably, at least one R is hydrogen); and each R' is independently hydrogen or lower alkyl group of up to about 7 carbon atoms (e.g., methyl, ethyl, butyl or heptyl groups). These preferred alpha, beta-unsaturated dicarboxylic acylating agents contain a total carbon content of up to about 25 carbon atoms, normally up to about 15 carbon atoms. Examples include maleic anhydride; benzyl maleic anhydride; chloromaleic anhydride; heptyl maleate; citaconic anhydride; ethyl fumarate; fumaric acid; mesaconic acid; ethyl, isopropyl maleate; isopropyl fumarate; hexyl, methyl maleate; phenyl maleic anhydride and the like. Of these preferred alpha, beta-unsaturated dicarboxylic compounds, maleic acylating agents are preferred.

Alternatively, the ester (OR') group in the above formula may contain more than 7 carbon atoms, being derived from a mixture of alcohols, some containing over 7 carbon atoms, and in such instances, the ester group may remain attached to the carboxy group during and after formation of the interpolymer. This procedure provides a method of introducing the desirable ester groups initially, and eliminates the need to introduce the ester groups in a separate subsequent step.

The molecular weight of the carboxy-containing interpolymer may be expressed in terms of the "reduced specific viscosity". Reduced specific viscosity is a widely recognized means of expressing the molecular size of a polymeric substance. As used herein, the reduced specific viscosity (abbreviated as RSV) is the value obtained in accordance with the formula $$RSV = \frac{\text{Relative Viscosity} - 1}{\text{Concentration}}$$

wherein the relative viscosity is determined by measuring, by means of a dilution viscometer, the viscosity of a solution of one gram of the interpolymer in 100 ml. of acetone and the viscosity of acetone at 30°±0.02° C. Whenever reference is made in this application to RSV or reduced specific viscosity, the reference is to the interpolymer before it is esterified. A more detailed discussion of the reduced specific viscosity, also known as the specific viscosity, as well as its relationship to the average molecular weight of an interpolymer, appears in Paul J. Flory, *Principles of Polymer Chemistry*, (1953 Edition) pages 308 et seq.

The carboxy-containing interpolymers of the present invention generally have a reduced specific viscosity from about 0.05, or about 0.1, or about 0.15, or even about 0.3 up to about 2, or to about 1. In another embodiment, the carboxy-containing interpolymers have a RSV from about 0.2, or about 0.35 to about 0.9, or to about 0.7.

Mixtures of two or more compatible (i.e., nonreactive to one another) interpolymers which are separately prepared are contemplated for use herein. When mixtures of two or more compatible interpolymers are used in the present invention, the RSV of the combined mixture is determined as described above. Thus, as used herein, and in the appended claims, the terminology "interpolymer" refers to either one separately prepared interpolymer or a mixture of two or more of such interpolymers.

As described above, the olefin may be reacted with an alpha, beta-unsaturated carboxylic acylating agent to form the carboxy-containing interpolymers used in the present invention. Generally, from about 0.75, or about 1, up to about 5, or to about 2.5 moles of olefin is reacted with each mole of alpha, beta-unsaturated carboxylic acylating agent. In one embodiment, equal molar proportions of olefin and carboxylic acylating agent are polymerized.

Particularly preferred carboxy-containing interpolymers useful in this invention are those of interpolymers made by reacting a maleic acylating agent with styrene. Copolymers of maleic anhydride and styrene having a molar ratio of the maleic anhydride to styrene of about 1:1 are especially useful. They can be prepared according to methods known in the art, as for example, free radical polymerization, such as those initiated by benzoyl peroxide solution. Examples of such suitable interpolymerization techniques are described in U.S. Pat. Nos. 2,938,016; 2,980,653; 3,085,994; 3,342,787; 3,418,292; 3,451,979; 3,536,461; 3,558,570; 3,702,300; and 3,723,375. These patents are incorporated herein by reference for their teaching of the preparation of suitable carboxy-containing interpolymers and also suitable styrene-maleic anhydride interpolymers, as well as esters prepared from the interpolymers. Polymerization of alpha-olefins and alpha, beta-unsaturated carboxylic acylating agents is described in U.S. Pat. No. 4,526,950, the disclosure of which is hereby incorporated by reference. Other preparative techniques are known in the art.

The carboxy-containing interpolymers may also be prepared using a interpolymerizable comonomer. The interpolymerizable comonomer is present in relatively minor portions. Generally, the amount is less than about 0.3 mole, usually less than about 0.15 moles of interpolymerizable comonomer for each mole of either the olefin or the alpha, beta-unsaturated carboxylic acylating agent. The interpolmerizable comonomers do not interfere with the polymerization of the olefin and the alpha, beta-unsaturated carboxylic acylating agent. Examples of interpolymerizable comonomers include acrylamides, acrylonitrile, vinyl pyrrolidinone, vinyl pyridine, vinyl ethers, vinyl carboxylates, and acrylic and methacrylic acids and esters. In one embodiment, the interpolymerizable comonomers are vinyl ethers, vinyl carboxylates, or acrylic and methacrylic acids and esters, preferably the lower alkyl acrylic or methacrylic esters, e.g., those containing from 1 to about 7 carbon atoms. When the interpolymerizable comonomer is an acrylic acid or methacrylic acid, it should be recognized that the acid may be esterified to form ester groups as is described herein.

The vinyl ether is represented by the formula $R_1$—$CH_2$=CH—$OR_2$ wherein each $R_1$ is hydrogen or a hydrocarbyl group having 1 to about 30, or to about 24, or to about 12 carbon atoms and $R_2$ is a hydrocarbyl group having 1 to about 30 carbon atoms, or to about 24, or to about 12. Examples of vinyl ethers include vinyl methylether, vinyl propylether, vinyl 2-ethylhexylether and the like.

The vinyl ester of a carboxylic acid may be represented by the formula $R_3CH$=CH—$O(O)CR_4$ wherein $R_3$ is a hydrogen or hydrocarbyl group having from 1 to about 30, or to 12 carbon atoms, or just hydrogen, and $R_4$ is a hydrocarbyl group having 1 to about 30, or to about 12, or to about 8. Examples of vinyl esters include vinyl acetate, vinyl 2-ethylhexanoate, vinyl butanoate, vinyl crotonate. Vinyl carboxylates include vinyl acetate, vinyl butanoate, etc.

The carboxy-containing interpolymers contain ester groups. In one embodiment, the ester groups are formed by reacting the carboxy-containing interpolymer with an alcohol. The alcohol generally contains at least 6 carbon atoms. In one embodiment, the alcohol contains from about 7, or about 8 to about 30, or to about 24, or even to about 18 carbon atoms. Examples of useful alcohols include heptanol, octanol, decanol, dodecanol, tridecanol, pentadecanol, octadecanol, etc.

One class of alcohols includes the commercially available mixtures of alcohols. The commercial alcohols includes, the oxoalcohols which comprise, for example, a mixture of alcohols having from about 8–24 carbon atoms. Of the various commercial alcohols, another class of alcohols includes the alcohols having from about 8 to 30 aliphatic carbon atoms. The alcohols may comprise, for example, octyl alcohol, decyl alcohol, dodecyl alcohol, tetradecyl alcohol, pentadecyl alcohol, eicosyl alcohol, octadecyl alcohol, etc. Several suitable sources of these alcohol mixtures are the technical grade alcohols sold under the name Neodol™ alcohols (Shell Oil Company, Houston, Tex.) and under the name Alfol™ alcohols (Continental Oil Company, Ponca City, Okla.).

In one embodiment, the esters are mixed esters derived from a combination of alcohols including alcohols containing at least 8 carbon atoms (relatively high molecular alcohols) and alcohols containing less than 7 carbon atoms (relatively low molecular weight alcohols. The alcohols containing less than 7 carbon atoms generally contain from 1, or about 2, to about 6, or to about 5 carbon atoms. Examples of the low molecular weight alcohols include methanol, ethanol, propanol, butanol, pentanol, hexanol, cyclopentanol, and cyclohexanol. The above list is also meant to include the various isomeric arrangements of these alcohols. For instance, butanol refers to n-butanol, sec-butanol, isobutanol, etc.

The mixed esters of the carboxy-containing interpolymer are most conveniently prepared by first esterifying the carboxy-containing interpolymer with a relatively high molecular weight alcohol and a relatively low molecular weight alcohol to convert at least about 50% and up to about 98% of the carboxy group of the interpolymer to ester groups and then neutralizing the remaining carboxy groups with an amine or a hydrazine such as those described below to obtain nitrogen-containing esters.

To incorporate the appropriate amounts of the two alcohol groups into the polymer to form mixed esters, the ratio of the high molecular weight alcohol to the low molecular weight alcohol used in the process should be within the range of from about 2:1 to about 9:1 on a molar basis. In most instances, the ratio is from about 2.5:1 to about 5:1.

The esterification may be accomplished simply by heating the carboxy- containing interpolymer and the alcohol or alcohols under conditions typical for affecting esterification. Such conditions usually include, for example, a temperature of at least about 80° C., or from about 150° C. to about 350° C., provided that the temperature is maintained below the decomposition point of the reaction mixture or individual components of the mixture. An excess of the alcohol reactant, a solvent or diluent, such as mineral oil, toluene, benzene, xylene or the like, and an esterification catalyst, such as toluene sulfonic acid, sulfuric acid, aluminum chloride, boron trifluoride-triethylamine, hydrochloric acid, ammonium sulfate, phosphoric acid, sodium methoxide or the like, may be used to facilitate the esterification. These conditions and variations thereof are well known in the art.

When utilizing a combination of a high molecular weight and a low molecular weight alcohol, the esterification may be carried out, for example, by initially esterifying at least about 50 molar percent and preferably from about 50 to 75 molar percent of the carboxy radicals with the high molecular weight alcohol and then subsequently esterifying the partially-esterified carboxy-containing interpolymer with a low molecular weight alcohol, e.g., 2–4 aliphatic carbon atoms, to obtain a carboxy interpolymer having approximately 50–75 molar percent of the carboxylic groups esterified with the high molecular weight aliphatic alcohol and approximately 23–48 molar percent of the carboxy radicals esterified with the low molecular weight aliphatic alcohol. For example, esterification with a combination of high and low molecular weight alcohols may be accomplished, in sequence, by first carrying out the esterification with the high molecular weight alcohol, e.g., up to about 75 molar percent and subsequently esterifying up to about 98 molar percent of the carboxylic groups with the low molecular weight alcohol. Alternatively, the carboxylic groups of the interpolymer may be simultaneously esterified with a mixture of the alcohols to obtain an esterified-carboxy interpolymer having up to about 60, or to about 70, or to about 80, or to about 90, or to about 95 or to about 98 mole percent of the carboxylic groups esterified with the high and low molecular weight aliphatic alcohols.

In another embodiment, the carboxy-containing interpolymers contains a carbonyl-amino group. Carbonyl-amino group is selected from amides, imides, amidines, ammonium salts or mixtures thereof. A carbonyl-amino group is derived from the carboxy group of the carboxy-containing interpolymer and an amine. The carbonyl-amino group may be present when the carboxy-containing interpolymer contains esters derived from a single alcohol or mixtures of alcohol as described above.

In one embodiment of the present invention, the extent of esterification in relation to the extent of neutralization of the unesterified carboxy groups of the carboxy-containing interpolymer through the conversion thereof to amino-containing groups is a consideration. For convenience, the relative proportions of the high molecular weight ester group to the low molecular weight ester group and to the carbonyl-amino group are expressed in terms of molar ratios of (60–90):(10–30):(2–15), respectively. The preferred ratio is (70–80):(15–25):5. It should be noted that the linkage described as the carbonyl-amino group may be amide, imide, or amidine, and inasmuch as any such linkage is contemplated within the present invention, the term "carbonyl-amino" is thought to be a convenient, generic expression useful for the purpose of defining the inventive concept.

The amines which are used to form carbonyl-amino group may be mono or polyamines and are described above. In one embodiment, the amines have one primary or secondary amino group and at least one mono-functional amino group such as a tertiary-amino or heterocyclic amino group.

Examples of amines having one primary or secondary amino group and at least one mono-functional amino group such as tertiary-amino or heterocyclic amino groups. Such compounds may thus be tertiary-amino-substituted primary or secondary amines or other substituted primary or secondary amines in which the substituent is derived from pyrroles, pyrrolidones, caprolactams, oxazolidones, oxazoles, thiazoles, pyrazoles, pyrazolines, imidazoles, imidazolines, thiazines, oxazines, diazines, oxacarbamyl, thiocarbamyl, uracils, hydantoins, thiohydantoins, guanidines, ureas, sulfonamides, phosphoramides, phenolthiazines, amidines, etc.

The carbonyl-amino group may also be a carbonyl-polyamino group. In this instance, the carbonyl-polyamino group is derived from a polyamine. In one embodiment, the carbonyl-polyamino group is derived from a morpholine. Examples of morpholines include aminoethylmorpholine, aminopropylmorpholine, etc. Examples of such polyamines include dimethylamino-ethylamine, dibutylamino-ethylamine, 3-dimethylamino-1-propylamine, 4-methylethylamino-1-butylamine, pyridyl-ethylamine, N-morpholinoethylamine, tetrahydropyridyl-ethylamine, bis-(dimethylamino)propylamine, bis-(diethylamino)ethylamine, N,N-dimethyl-p-phenylene diamine, piperidyl-ethylamine, 1-aminoethyl pyrazone, 1-(methyl-amino) pyrazoline, 1-methyl-4-aminooctylpyrazole, 1-aminobutyl imidazole, 4-aminoethylthiazole, 2-aminoethyltriazine, dimethylcarbamylpropylamine, N-methyl-N-aminopropylacetamide, N-aminoethylsuccinimide, N-methylaminomaleimide, N-aminobutylalpha-chlorosuccinimide, 3-aminoethyluracil, 2-aminoethylpyridine, orthoaminoethyl-N,N-dimethylbenzenesulfamide, N-aminoethyl phenothiazine, N-aminoethylacetamidine, 1-aminophenyl-2-methyl-imidazoline, N-methyl-N-aminoethyl-S-ethyldithiocarbamate, etc. For the most part, the amines are those which contain only one primary-amino or secondary-amino group and, in one embodiment, also, at least one tertiary-amino group. The tertiary amino group is preferably a heterocyclic amino group. In some instances polyamines may contain up to about 6 amino groups although, in most instances, they contain one primary-amino group and either one or two tertiary-amino groups. The polyamines may be aromatic or aliphatic amines and are preferably heterocyclic amines such as amino-alkyl-substituted morpholines, piperazines, pyridines, benzopyrroles, quinolines, pyrroles, etc. They are usually amines having from 4 to about 30, or to about 12 carbon atoms. Polar substituents may likewise be present in the amines.

The carbonyl-amino groups of the carboxy-containing interpolymers also may comprise the groups derived from hydrazine and/or a hydrocarbon-substituted hydrazine including, for example, the mono-, di-, tri-, and tetrahydrocarbon-substituted hydrazines wherein the hydrocarbon substituent is either an aliphatic or aromatic substituent including, for example, the alkyl-, e.g., cyclic and/or acyclic groups, aryl-, alkylaryl-, aralkyl, etc. The hydrocarbon substituents, generally, contain from 1, up to about 24, or to about 12 aliphatic carbon atoms. The preferred substituents, however, include for example, phenyl, alkylphenyl or an alkyl group wherein the alkyl group is either a methyl, ethyl, propyl, butyl, pentyl, octyl, cyclohexyl, decyl or dodecyl group. Other examples of the hydrocarbon groups include octyldecyl, behenyl, benzyl, heptaphenyl, alpha-naphthyl, beta-naphthyl, butyl-naphthyl, oleyl, and stearyl groups. Of the various hydrocarbon-substituted hydrazines, a preferred class includes the N,N-dihydrocarbon-substituted hydrazines, e.g., the dimethyl, diethyl, diphenyl and dibutyl hydrazines.

In the embodiment when the carboxy-containing interpolymer is characterized as containing a carbonylamino group, then the carboxy-containing interpolymer may be esterified as described above. Following esterification of the carboxy groups of the interpolymer with either one or more of the high and low molecular weight alcohols, at least about 2.0 molar percent and approximately 2, or about 5 to 50, or to about 25 molar percent of the carboxy groups of the interpolymer may be reacted with an amine at temperatures ranging from about 80°–300° C. The reaction temperatures may range from about 80° C. to 350° C. or higher provided that the temperature is maintained below the decomposition point of either the reactants or the products obtained thereof. Thus, for example, at least about 50 mole percent, e.g., 50–98 mole percent, of the carboxy groups of a carboxy-containing interpolymer may be esterified with a high molecular weight aliphatic alcohol and then subsequently reacted with a polyamine compound, etc., to obtain a nitrogen-containing ester having about 2 to 50, or to 35 molar percent of the carboxylic groups converted to carbonyl-amino groups. If a mixture of alcohols including the high molecular weight and low molecular weight alcohols is used to esterify the carboxyl groups of said interpolymer, then at least about 2 molar percent of the carboxyl groups of said interpolymer are reacted with the amino compound, to obtain the carbonyl-amino groups. The amount of amine is sufficient to neutralize substantially all of the unesterified carboxy groups of the polymer. An excess of amine may be used.

The following examples serve to illustrate the preparation of the esters and nitrogen-containing esters of the carboxy-containing interpolymers used in this invention and are not intended as limiting thereof.

EXAMPLE 26

A styrene-maleic interpolymer is obtained by preparing a solution of styrene (16.3 parts by weight) and maleic anhydride (12.9 parts) in a benzene-toluene solution (270 parts; weight ratio of benzene:toluene being 66.5:33.5) and contacting the solution at 86° C. in nitrogen atmosphere for 8 hours with a catalyst solution prepared by dissolving 70% benzoyl peroxide (0.42 part) in a similar benzene-toluene mixture (2.7 parts). The resulting product is a thick slurry of the interpolymer in the solvent mixture. To the slurry there is added mineral oil (141 parts) while the solvent mixture is being distilled off at 150° C. and then at 150° C./200 mm. Hg. To 209 parts of the stripped mineral oil-interpolymer slurry (the interpolymer having a reduced specific viscosity of 0.72) there are added toluene (25.2 parts), n-butyl alcohol (4.8 parts), a commercial alcohol consisting essentially of primary alcohols having from 12 to 18 carbon atoms (56.6 parts) and a commercial alcohol consisting of primary alcohols having from 8 to 10 carbon atoms (10 parts) and to the resulting mixture there is added 96% sulfuric acid (2.3 parts). The mixture is then heated at 150°–160° C. for 20 hours whereupon water is distilled off. An additional amount of sulfuric acid (0.18 part) together with an additional amount of n-butyl alcohol (3 parts) is added and the esterification is continued until 95% of the carboxy radicals of the polymer has been esterified. To the esterified interpolymer, there is then added aminopropyl morpholine (3.71 parts; 10% in excess of the stoichiometric amount required to neutralize the remaining free carboxy radicals) and the resulting mixture is heated to 150°–160° C./10 mm. Hg to distill off toluene and any other volatile components. The stripped product is mixed with an additional amount of mineral oil (12 parts) and filtered. The filtrate is a mineral oil solution of the nitrogen-containing mixed ester having a nitrogen content of 0.16–0.17%.

EXAMPLE 27

The procedure of Example 26 is followed except that the esterification is carried out by first esterifying the styrene-maleic interpolymer with the commercial alcohols having from 8 to 18 carbon atoms until 70% of the carboxyl radicals of the interpolymer have been converted to ester radicals and thereupon continuing the esterification with any yet-unreacted commercial alcohols and n-butyl alcohol until 95% of the carboxyl radicals of the interpolymer have been converted to ester radicals.

EXAMPLE 28

The procedure of Example 26 is followed except that the interpolymer is prepared by polymerizing a solution consisting of styrene (416 parts), maleic anhydride (392 parts) in benzene (2153 parts) and toluene (5025 parts) in the presence of benzoyl peroxide (1.2 parts) at 65°–106° C. The resulting interpolymer has a reduced specific viscosity of 0.45.

EXAMPLE 29

The procedure of Example 26 is followed except that the styrene-maleic anhydride is obtained by polymerizing a mixture of styrene (416 parts), maleic anhydride (392 parts), benzene (6101 parts) and toluene (2310 parts) in the presence of benzoyl peroxide (1.2 parts) at 78°–92° C. The resulting interpolymer has a reduced specific viscosity of 0.91.

EXAMPLE 30

An interpolymer (0.86 carboxyl equivalent) of styrene and maleic anhydride (prepared from an equal molar mixture of styrene and maleic anhydride and having a reduced specific viscosity of 0.67–0.68) is mixed with mineral oil to form a slurry, and then esterified with a commercial alcohol mixture (0.77 mole; comprising primary alcohols having from 8 to 18 carbon atoms) at 150°–160° C. in the presence of a catalytic amount of sulfuric acid until about 70% of the carboxyl radicals are converted to ester radicals. The partially esterified interpolymer is then further esterified with n-butyl alcohol (0.31 mole) until 95% of the carboxyl radicals of the interpolymer are converted to the mixed ester radicals. The esterified interpolymer is then treated with aminopropyl morpholine (slight excess of the stoichiometric amount to neutralize the free carboxyl radicals of the interpolymer) at 150°–160° C. until the resulting product is substantially neutral (acid number of 1 to phenolphthalein indicator). The resulting product is mixed with mineral oil so as to form an oil solution containing 34% of the polymeric product.

EXAMPLE 31

The procedure of Example 26 is followed except a 64% aqueous solution of hydrazine is used instead of aminomorpholine and 126 parts of mineral oil is used instead of 12 parts of mineral oil.

EXAMPLE 32

The procedure of Example 30 is followed N,N-dibutylhydrazine is used instead of aminopropylmorpholine.

(C) Weighting Agents

The compositions of the present invention may additionally contain weighting agents. These agents increase density of drilling muds and include galena (PbS), hematite ($Fe_2O_3$), magnetite ($Fe_3O_4$), ilmenite ($FeTiO_3$), barite ($BaSO_4$), siderite ($FeCO_3$), celestite ($SrSO_4$), dolomite ($CaMg(CO_3)2$), and calcite ($CaCO_3$). Particularly useful weighting agents include barium sulfate and iron oxide. Weighting agents may also be soluble salts such as sodium chloride, sodium bromide, sodium carbonate, potassium chloride, potassium carbonate, calcium bromide, zinc chloride, and zinc bromide. The weighting agents may be present in an amount from about 20, or about 100, or about 250, to about 900, or to about 700, or to about 600. In one embodiment, the weighting agent is present in an amount from about 300 to about 500, or about 400 pounds per barrel (ppb).

(D) Organophilic Clay

The compositions may also contain commercial clays such as bentonite, attapulgite, sepiolite, etc. In one embodiment, the compositions may also include an organophilic clay. Organophilic clays are clays, such as montmorillonite, hectorite, saponite, attapulgite and illite, that have absorbed amine salts. These clays are converted from water-yielding (e.g., present in the brine phase of the emulsion) to oil-yielding (e.g., present in the liquid oil phase) clays by the absorption of amine salts. Organophilic clays are preferably oil-wetable and are dispersed in the oil phase to produce viscosity and gel properties. Montmorillonite, bentonite and attapulgite are preferred, with mortmorillonite more preferred. Water and methanol may be used to activate the organophilic clay. The organophilic clay is present in an amount from about 1, or about 2 up to about 10, or to about 8 pounds per barrel (ppb).

Lime

The compositions of the present invention may also include lime. The lime in combination with the reaction products or their salts (A) provides improved thickening to the compositions. The lime is generally present in an amount from about 1, or about 2, up to about 10, or about 8 pounds per barrel (ppb).

Well-Drilling Compositions

In one embodiment, the compositions of the present invention are well-drilling compositions. In one embodiment, the well-drilling compositions are invert water-in-oil emulsions. The well-drilling compositions generally have a density of about 9, or about 10 to about 21, or to about 18, or to about 14 pounds per gallon.

In one embodiment, the compositions of the present invention contain less than 1%, or less than 0.5% by weight of an oxygen-supplying salt. In another embodiment, the compositions are free of oxygen-supplying salts. These salts include ammonium nitrate and alkali or alkaline earth metal nitrates, chlorates, perchlorates and mixtures thereof. Specific examples of the oxygen-supplying salts are sodium nitrate, sodium perchlorate and ammonium perchlorate. The oxygen-supplying salts are used in an emulsion explosives. In one embodiment, the compositions of the present invention are non-explosive.

In another embodiment, the compositions contain less than 1% by weight, or 0.5% by weight of a non-oxidizing acid. In one embodiment, the compositions are free of non-oxidizing acids. These acids include an inorganic acid such as hydrochloric acid, sulfuric acid, hydrofluoric acid, sulfamic acid and the like, as well as organic acids including 1 to about 3 carbon atoms such as formic acid, acetic acid, propionic acid and the like. These non-oxidizing acids are typically used in acidizing fluids and in this embodiment are not present in the compositions of the present invention.

The following examples relate to the compositions of the present invention.

Example A

A composition is prepared by mixing an amount of 20.2 gallons of No. 2 diesel fuel with 14.1 gallons of a 30% calcium chloride brine solution. Then, 5 pounds per barrel (ppb) of the product of Example 1, 5 ppb. of lime, 1.25 ppb. of CARBOGEL (a organophillic clay available commercially from Milpark), and 162 ppb. of MIL BAR (barium chloride available from Milpark) are added to the mixture. The contents are mixed in a waring blender to form a 50:50 water-in-oil emulsion.

Examples B–T

Following the procedure of Example A, the examples in the following table are prepared. In the following examples "bbl" means barrels and "ppb" means pounds per barrel.

TABLE

| | Ex. B | Ex. C | Ex. D | Ex. E | Ex. F |
|---|---|---|---|---|---|
| Diesel Fuel Oil (bbl.) | 0.34 | 0.34 | 0.55 | 0.55 | 0.55 |
| Product of Ex. 12 (ppb) | 5 | — | 8 | 4 | — |
| Ex. 22 (ppb) | — | 5 | — | — | 6 |
| Lime (ppb) | 5 | 7 | 5 | 5 | 4 |
| CARBO-GEL (ppb) | 1.25 | 1.0 | 2 | 2 | 1.5 |
| Product of Ex. 26 (ppb) | 5 | 10 | 5 | 5 | 8 |
| 30% CaCl$_2$ Brine (bbl.) | 0.48 | 0.48 | 0.26 | 0.26 | 0.26 |
| MIL-BAR (ppb) | 162 | 160 | 206 | 206 | 210 |

| | Ex. G | Ex. H | Ex. I | Ex. J |
|---|---|---|---|---|
| Conoco LVT 200 (bbl.) | 0.34 | 0.55 | — | — |
| Total HDF 200 (bbl.) | — | — | 0.34 | 0.55 |
| Product of Ex. 12 (ppb) | 5 | 6 | — | — |
| Ex. 22 (ppb) | — | — | 4 | 6 |
| Lime (ppb) | 4 | 5 | 7 | 5 |
| CARBOGEL (ppb) | 0.75 | 1.5 | 2 | 1.0 |
| Product of Ex. 26 (ppb) | — | 10 | — | 5 |
| 30% CaCl$_2$ Brine (bbl.) | 0.48 | 0.26 | 0.48 | 0.26 |
| MILBAR (ppb) | 175 | 190 | 210 | 160 |

| | Ex. K | Ex. L | Ex. M | Ex. N | Ex. O |
|---|---|---|---|---|---|
| Product of Ex. 3 | 2 | — | — | — | — |
| Product of Ex. 4 | — | 1.5 | — | — | — |
| Product of Ex. 12 | — | — | 1.5 | 2.2 | 1.5 |
| Sun 40N oil | 23 | 21 | 20.8 | 20.1 | 20.8 |
| Zinc Bromide | 47 | 45 | 46.7 | 46.7 | 60.0 |
| Brine | 28 | 32.5 | 31.0 | 31.0 | 17.7 |

| | Ex. P | Ex. Q | Ex. R | Ex. S | Ex. T |
|---|---|---|---|---|---|
| Product of Ex. 3 | 2 | — | — | — | — |
| Product of Ex. 4 | — | 1.5 | — | — | — |
| Product of Ex. 12 | — | — | 1.5 | 2.2 | 1.5 |
| Diisodecyl ether | 23 | 21 | 20.8 | 20.1 | 20.8 |
| Zinc Bromide | 47 | 45 | 46.7 | 46.7 | 60.0 |
| Brine | 28 | 32.5 | 31.0 | 31.0 | 17.7 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A composition comprising:
   a mixture of brine and a liquid oil;
   (A) an emulsifying amount of
      (i) at least one reaction product of a hydrocarbyl-substituted succinnic acylating agent and at least one of (a) ammonia, (b) an alcohol, or (c) an amine, or at least one salt of the reaction product, or (ii) at least one reaction product of a hydroxyaromatic compound, an aldehyde, and an amine;

(B) at least one ester of a carboxy-containing interpolymer, wherein the carboxy groups are the basis of the ester group contained within the molecule, and wherein the interpolymer is prepared by polymerizing an olefin selected from the group consisting of alpha-olefins and vinyl aromatic monomers with at least one alpha, beta-unsaturated carboxylic acylating agent.

2. The composition of claim 1, wherein the olefin is a vinyl aromatic monomer selected from styrene or substituted styrene, and the alpha, beta-unsaturated carboxylic acylating agent is an acrylic, methacrylic, fumaric or maleic acylating agent.

3. The composition of claim 1, wherein the olefin is a alpha-olefin containing 8 to about 30 carbon atoms, and the alpha, beta-unsaturated carboxylic acylating agent is an acrylic, methacrylic, fumaric or maleic acylating agent.

4. The composition of claim 1, wherein the ester group is derived from at least one alcohol having at least 8 carbon atoms.

5. The composition of claim 4, wherein the ester group is derived from a mixture of (a) at least one alcohol containing from 8 to about 40 carbon atoms, and (b) an alcohol containing 2 to about 6 carbon atoms.

6. The composition of claim 4, wherein the interpolymer has carbonyl-amino groups derived from a monoamine or polyamine.

7. The composition of claim 1, wherein the ester group is derived from at least one alcohol containing about 8 to about 40 carbon atoms.

8. The composition of claim 1, wherein the carboxy-containing interpolymer is characterized as having pendant polar groups and wherein the pendant polar groups comprise: (a) a relatively high molecular weight carboxylic ester group having at least 8 aliphatic carbon atoms in the ester radical, (b) a relatively low molecular weight carboxylic ester group having no more than 7 aliphatic carbon atoms in the ester radical, and (c) a carbonyl-amino group derived from an amino containing compound having one primary or secondary amino group.

9. The composition of claim 1 wherein the composition contains from about 5 to about 90 parts by volume of the brine as a discontinuous phase and from 10 to 95 parts by volume of the liquid oil as the continuous phase, wherein the total parts by volume of brine and liquid oil total 100 parts by volume;

wherein the emulsifying product of (A) is a reaction product of a hydrocarbyl-substituted succinic acylating agent, having a hydrocarbyl group containing an average from about 8 to about 300 carbon atoms, and a hydroxyamine, or a salt of the reaction product, and wherein the emulsifying product of (A) comprises at least about 0.5% by weight of the composition.

10. The composition of claim 9, wherein the olefin is styrene or substituted styrene and the alpha, beta-unsaturated carboxylic acylating agent is a maleic acylating agent.

11. The composition of claim 9, wherein the ester groups are derived from at least one alcohol containing at least 8 carbon atoms.

12. The composition of claim 9, wherein the ester groups are derived from at least alcohol having at least 8 aliphatic carbon atoms and wherein the interpolymer contains carbonyl-amino groups derived from an amine.

13. A composition comprising a mixture of from about 5 to about 90 parts by volume of a brine as a discontinuous phase and from 10 to 95 parts by volume of a liquid oil as a continuous phase, wherein the total parts by volume of brine and liquid oil total 100 parts by volume; and (A) at least about 0.5% by weight of a reaction product of a hydrocarbyl-substituted succinic acylating agent, having a hydrocarbyl group containing an average of from about 8 to about 300 carbon atoms, and a hydroxyamine, or a salt of the reaction product; and further comprising (C) a weighting agent selected from barium sulfate, iron oxide, calcium chloride, calcium bromide, zinc chloride, and zinc bromide; or (D) an organophilic clay.

14. A method, comprising the steps of introducing the composition of claim 13 into a wellbore hole and drilling, completing or working over the wellbore hole.

15. A composition comprising a mixture of from about 5 to about 90 parts by volume of a brine as a discontinuous phase and from 10 to 95 parts by volume of a liquid oil as a continuous phase, wherein the total parts by volume of brine and liquid oil total 100 parts by volume; and (A) at least about 0.5% by weight of a reaction product of a hydrocarbyl-substituted succinic acylating agent, having a hydrocarbyl group containing an average of from about 8 to about 300 carbon atoms, and a hydroxyamine, or a salt of the reaction product;

wherein the composition is a drilling fluid or completion fluid.

* * * * *